US008463032B2

(12) United States Patent  
Matsuoka

(10) Patent No.: US 8,463,032 B2  
(45) Date of Patent: Jun. 11, 2013

(54) IMAGE COMPRESSING APPARATUS, COMPRESSED IMAGE OUTPUTTING APPARATUS, IMAGE COMPRESSION METHOD, AND RECORDING MEDIUM

(75) Inventor: Teruhiko Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 341 days.

(21) Appl. No.: 13/008,378

(22) Filed: Jan. 18, 2011

(65) Prior Publication Data

US 2011/0176728 A1 Jul. 21, 2011

(30) Foreign Application Priority Data

Jan. 18, 2010 (JP) .................................. 2010-008380

(51) Int. Cl.
*G06K 9/36* (2006.01)

(52) U.S. Cl.
USPC .......................................................... 382/166

(58) Field of Classification Search
None
See application file for complete search history.

(56) References Cited

U.S. PATENT DOCUMENTS

| 6,631,210 | B1 * | 10/2003 | Mutoh et al. | 382/176 |
| 6,735,341 | B1 * | 5/2004 | Horie et al. | 382/239 |
| 6,741,755 | B1 * | 5/2004 | Blake et al. | 382/284 |
| 7,133,565 | B2 | 11/2006 | Toda et al. | |
| 2002/0037100 | A1 * | 3/2002 | Toda et al. | 382/166 |
| 2002/0090110 | A1 * | 7/2002 | Braudaway et al. | 382/100 |
| 2004/0165081 | A1 * | 8/2004 | Shibaki et al. | 348/222.1 |
| 2004/0252316 | A1 * | 12/2004 | Miyagi et al. | 358/1.9 |
| 2005/0089216 | A1 * | 4/2005 | Schiller et al. | 382/159 |
| 2005/0238244 | A1 * | 10/2005 | Uzawa | 382/242 |
| 2006/0001690 | A1 * | 1/2006 | Martinez et al. | 347/19 |
| 2006/0133690 | A1 * | 6/2006 | Bloomberg et al. | 382/269 |
| 2006/0171587 | A1 * | 8/2006 | Kanatsu | 382/173 |
| 2007/0189615 | A1 * | 8/2007 | Liu et al. | 382/232 |
| 2009/0023598 | A1 * | 1/2009 | Thastrup et al. | 506/10 |
| 2009/0046938 | A1 * | 2/2009 | Yoder | 382/242 |

FOREIGN PATENT DOCUMENTS

| JP | 5-328143 A | 12/1993 |
| JP | 2000-354170 A | 12/2000 |
| JP | 2003-18413 A | 1/2003 |
| JP | 2005-204207 A | 7/2005 |
| JP | 2005-210570 A | 8/2005 |

* cited by examiner

*Primary Examiner* — Wenpeng Chen
*Assistant Examiner* — Feng Niu
(74) *Attorney, Agent, or Firm* — Birch, Stewart, Kolasch & Birch, LLP

(57) ABSTRACT

In a color image processing apparatus, in a compression process section (an image compressing apparatus), when an original document is compressed, the edges of black texts and/or line drawings in the original document is detected, then a foreground layer (a first image) is generated in which the detected edges are expressed in the form of a binary image, and then lossless compression is performed on the foreground layer. Further, a background layer (a second image) is generated in which a density difference of the edges from the other parts in the original document is reduced, and then lossy compression is performed on the background layer. Then, these layers are combined into a compressed file.

9 Claims, 25 Drawing Sheets

| 000 | 110 | 010 | 110 | 001 |
|-----|-----|-----|-----|-----|
| 000 | 110 | 010 | 110 | 001 |
| 100 | 010 | 010 | 110 | 001 |
| 100 | 010 | 110 | 010 | 001 |
| 000 | 010 | 010 | 010 | 000 |

| 0 | 1 | 0 | 1 | 0 |
|---|---|---|---|---|
| 0 | 1 | 0 | 1 | 0 |
| 1 | 0 | 0 | 1 | 0 |
| 1 | 0 | 1 | 0 | 0 |
| 0 | 0 | 0 | 0 | 0 |

FIG. 8A

| 255 | 255 | 255 | 255 | 255 | 255 | 60 | 10 | 60 | 255 | 255 |
|---|---|---|---|---|---|---|---|---|---|---|
| 255 | 255 | 255 | 255 | 255 | 255 | 60 | 10 | 60 | 255 | 255 |
| 255 | 255 | 255 | 255 | 255 | 255 | 40 | 10 | 60 | 255 | 255 |
| 255 | 255 | 255 | 255 | 255 | 60 | 10 | 40 | 255 | 255 | 255 |
| 255 | 255 | 255 | 255 | 255 | 60 | 10 | 60 | 255 | 255 | 255 |
| 255 | 255 | 255 | 255 | 255 | 60 | 10 | 60 | 255 | 255 | 255 |
| 255 | 255 | 255 | 255 | 255 | 40 | 10 | 60 | 255 | 255 | 255 |
| 255 | 255 | 255 | 255 | 60 | 10 | 40 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 40 | 10 | 60 | 255 | 255 | 255 | 255 |
| 255 | 255 | 255 | 60 | 10 | 40 | 255 | 255 | 255 | 255 | 255 |
| 255 | 255 | 255 | 60 | 10 | 60 | 255 | 255 | 255 | 255 | 255 |
| 255 | 255 | 255 | 60 | 10 | 60 | 255 | 255 | 255 | 255 | 255 |
| 255 | 255 | 255 | 40 | 10 | 60 | 255 | 255 | 255 | 255 | 255 |
| 255 | 255 | 60 | 10 | 40 | 255 | 255 | 255 | 255 | 255 | 255 |
| 255 | 255 | 40 | 10 | 60 | 255 | 255 | 255 | 255 | 255 | 255 |
| 255 | 60 | 10 | 40 | 255 | 255 | 255 | 255 | 255 | 255 | 255 |
| 255 | 60 | 10 | 60 | 255 | 255 | 255 | 255 | 255 | 255 | 255 |

FIG. 8B

| -1 |  | 1 |
|---|---|---|
| -1 |  | 1 |
| -1 |  | 1 |

| -1 | -1 | -1 |
|---|---|---|
|  |  |  |
| 1 | 1 | 1 |

FIG. 9A

| | | | | | | | | |
|---|---|---|---|---|---|---|---|---|
| 0 | 0 | 0 | 0 | 625 | 755 | 0 | 735 | 585 |
| 0 | 0 | 0 | 390 | 900 | 725 | 440 | 930 | 585 |
| 0 | 0 | 0 | 585 | 930 | 440 | 725 | 900 | 390 |
| 0 | 0 | 0 | 585 | 735 | 0 | 755 | 625 | 0 |
| 0 | 0 | 0 | 625 | 755 | 0 | 735 | 585 | 0 |
| 0 | 0 | 390 | 900 | 725 | 440 | 930 | 585 | 0 |
| 0 | 0 | 585 | 930 | 440 | 725 | 900 | 390 | 0 |
| 0 | 0 | 585 | 735 | 0 | 755 | 625 | 0 | 0 |
| 0 | 0 | 585 | 735 | 0 | 735 | 585 | 0 | 0 |
| 0 | 0 | 625 | 755 | 0 | 735 | 585 | 0 | 0 |
| 0 | 390 | 900 | 725 | 440 | 930 | 585 | 0 | 0 |
| 0 | 585 | 930 | 440 | 725 | 900 | 390 | 0 | 0 |
| 0 | 585 | 735 | 0 | 755 | 625 | 0 | 0 | 0 |
| 0 | 625 | 755 | 0 | 735 | 585 | 0 | 0 | 0 |
| 390 | 900 | 725 | 440 | 930 | 585 | 0 | 0 | 0 |
| 625 | 950 | 440 | 725 | 900 | 390 | 0 | 0 | 0 |
| 900 | 725 | 440 | 950 | 625 | 0 | 0 | 0 | 0 |
| 930 | 440 | 725 | 900 | 390 | 0 | 0 | 0 | 0 |

FIG. 9B

| | | | | | | | | |
|---|---|---|---|---|---|---|---|---|
| 0 | 0 | 0 | 0 | 1 | 1 | 0 | 1 | 1 |
| 0 | 0 | 0 | 0 | 1 | 1 | 0 | 1 | 1 |
| 0 | 0 | 0 | 1 | 1 | 0 | 1 | 1 | 0 |
| 0 | 0 | 0 | 1 | 1 | 0 | 1 | 1 | 0 |
| 0 | 0 | 0 | 1 | 1 | 0 | 1 | 1 | 0 |
| 0 | 0 | 0 | 1 | 1 | 0 | 1 | 1 | 0 |
| 0 | 0 | 1 | 1 | 0 | 1 | 1 | 0 | 0 |
| 0 | 0 | 1 | 1 | 0 | 1 | 1 | 0 | 0 |
| 0 | 0 | 1 | 1 | 0 | 1 | 1 | 0 | 0 |
| 0 | 0 | 1 | 1 | 0 | 1 | 1 | 0 | 0 |
| 0 | 0 | 1 | 1 | 0 | 1 | 1 | 0 | 0 |
| 0 | 1 | 1 | 0 | 1 | 1 | 0 | 0 | 0 |
| 0 | 1 | 1 | 0 | 1 | 1 | 0 | 0 | 0 |
| 0 | 1 | 1 | 0 | 1 | 1 | 0 | 0 | 0 |
| 0 | 1 | 1 | 0 | 1 | 1 | 0 | 0 | 0 |
| 1 | 1 | 0 | 1 | 1 | 0 | 0 | 0 | 0 |
| 1 | 1 | 0 | 1 | 1 | 0 | 0 | 0 | 0 |
| 1 | 0 | 1 | 1 | 0 | 0 | 0 | 0 | 0 |

FIG. 10

| | | | | | | | | | |
|---|---|---|---|---|---|---|---|---|---|
| | 0 | 0 | 0 | 0 | 0 | 1 | 0 | 1 | 0 |
| | 0 | 0 | 0 | 0 | 0 | 1 | 0 | 1 | 0 |
| | 0 | 0 | 0 | 0 | 1 | 0 | 1 | 0 | 0 |
| | 0 | 0 | 0 | 0 | 1 | 0 | 1 | 0 | 0 |
| | 0 | 0 | 0 | 0 | 1 | 0 | 1 | 0 | 0 |
| | 0 | 0 | 0 | 0 | 1 | 0 | 1 | 0 | 0 |
| | 0 | 0 | 0 | 1 | 0 | 1 | 0 | 0 | 0 |
| | 0 | 0 | 0 | 1 | 0 | 1 | 0 | 0 | 0 |
| | 0 | 0 | 0 | 1 | 0 | 1 | 0 | 0 | 0 |
| | 0 | 0 | 0 | 1 | 0 | 1 | 0 | 0 | 0 |
| | 0 | 0 | 0 | 1 | 0 | 1 | 0 | 0 | 0 |
| | 0 | 0 | 1 | 0 | 1 | 0 | 0 | 0 | 0 |
| | 0 | 0 | 1 | 0 | 1 | 0 | 0 | 0 | 0 |
| | 0 | 0 | 1 | 0 | 1 | 0 | 0 | 0 | 0 |
| | 0 | 0 | 1 | 0 | 1 | 0 | 0 | 0 | 0 |
| | 0 | 1 | 0 | 1 | 0 | 0 | 0 | 0 | 0 |
| | 0 | 1 | 0 | 1 | 0 | 0 | 0 | 0 | 0 |
| | 1 | 0 | 1 | 0 | 0 | 0 | 0 | 0 | 0 |
| | | | | | | | | | |

F I G. 1 2
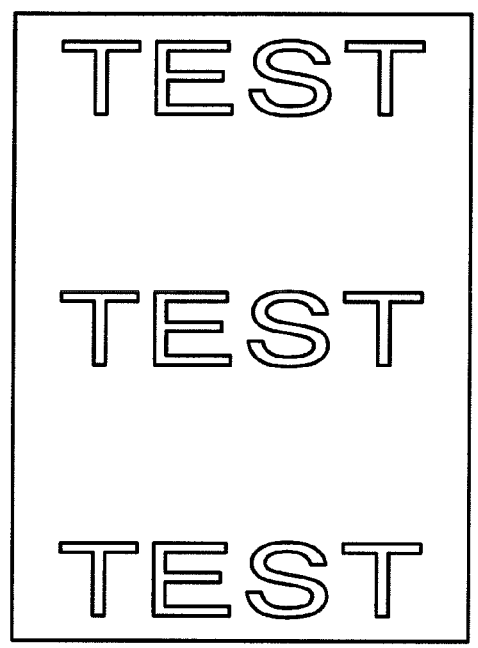

FIG. 14

| 3 | 2 | 2 | 2 | 2 | 2 | 3 |
|---|---|---|---|---|---|---|
| 1 | 2 | 2 | 2 | 2 | 2 | 1 |
| 1 | 1 | 0 | 0 | 0 | 1 | 1 |
| 1 | 1 | 0 | 0 | 0 | 1 | 1 |
| 1 | 1 | 0 | 0 | 0 | 1 | 1 |
| 1 | 2 | 2 | 2 | 2 | 2 | 1 |
| 3 | 2 | 2 | 2 | 2 | 2 | 3 |

FIG. 15

| 0 | 0 | 0 | 0 | 0 | 0 | 0 |
|---|---|---|---|---|---|---|
| 0 | 0 | 0 | 0 | 0 | 0 | 0 |
| 0 | 0 | 1 | 1 | 1 | 0 | 0 |
| 0 | 0 | 1 | 8 | 1 | 0 | 0 |
| 0 | 0 | 1 | 1 | 1 | 0 | 0 |
| 0 | 0 | 0 | 0 | 0 | 0 | 0 |
| 0 | 0 | 0 | 0 | 0 | 0 | 0 |

FIG. 16A

| 243 | 243 | 243 | 242 | 242 | 242 | 242 | 244 | 243 | 243 | 243 | 243 |
|---|---|---|---|---|---|---|---|---|---|---|---|
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 150 | 150 | 150 | 150 | 150 | 150 | 243 | 243 | 243 |
| 243 | 243 | 150 | 102 | 102 | 102 | 102 | 102 | 101 | 150 | 243 | 243 |
| 241 | 150 | 101 | 60 | 60 | 57 | 59 | 57 | 54 | 102 | 150 | 241 |
| 242 | 150 | 101 | 60 | 60 | 57 | 59 | 57 | 54 | 102 | 102 | 150 |
| 242 | 150 | 101 | 60 | 60 | 57 | 59 | 57 | 51 | 62 | 101 | 102 |
| 244 | 150 | 104 | 58 | 58 | 54 | 55 | 57 | 61 | 64 | 64 | 104 |
| 244 | 150 | 102 | 62 | 62 | 61 | 52 | 53 | 61 | 64 | 63 | 64 |
| 243 | 243 | 150 | 102 | 102 | 102 | 102 | 102 | 103 | 101 | 63 | 63 |
| 243 | 243 | 243 | 150 | 150 | 150 | 150 | 150 | 150 | 103 | 104 | 63 |
| 243 | 243 | 243 | 242 | 242 | 242 | 242 | 244 | 243 | 150 | 103 | 102 |
| 243 | 243 | 243 | 242 | 242 | 242 | 242 | 244 | 243 | 243 | 150 | 102 |
| 243 | 243 | 243 | 242 | 242 | 242 | 242 | 244 | 243 | 243 | 243 | 150 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |

FIG. 16B

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 1 | 1 | 1 | 1 | 1 | 1 | 0 | 0 | 0 |
| 0 | 0 | 1 | 0 | 0 | 0 | 0 | 0 | 0 | 1 | 0 | 0 |
| 0 | 0 | 1 | 0 | 0 | 0 | 0 | 0 | 0 | 1 | 1 | 0 |
| 0 | 0 | 1 | 0 | 0 | 0 | 0 | 0 | 0 | 0 | 1 | 1 |
| 0 | 0 | 1 | 0 | 0 | 0 | 0 | 0 | 0 | 0 | 0 | 0 |
| 0 | 0 | 1 | 0 | 0 | 0 | 0 | 0 | 0 | 0 | 0 | 0 |
| 0 | 0 | 0 | 1 | 1 | 1 | 1 | 1 | 1 | 0 | 0 | 0 |
| 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 17

| 243 | 243 | 243 | 242 | 242 | 242 | 242 | 244 | 243 | 243 | 243 | 243 |
|---|---|---|---|---|---|---|---|---|---|---|---|
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 237 | 230 | 224 | 224 | 225 | 226 | 231 | 237 | 243 | 243 |
| 243 | 237 | 222 | 167 | 158 | 158 | 158 | 158 | 167 | 222 | 237 | 243 |
| 243 | 222 | 155 | 171 | 157 | 146 | 145 | 153 | 159 | 155 | 222 | 243 |
| 241 | 166 | 135 | 76 | 67 | 66 | 66 | 65 | 72 | 119 | 158 | 241 |
| 242 | 158 | 118 | 67 | 59 | 57 | 58 | 56 | 60 | 97 | 79 | 150 |
| 242 | 158 | 112 | 67 | 59 | 57 | 57 | 56 | 57 | 68 | 70 | 102 |
| 244 | 158 | 118 | 67 | 58 | 56 | 55 | 56 | 59 | 64 | 71 | 104 |
| 244 | 167 | 135 | 77 | 68 | 67 | 62 | 63 | 68 | 68 | 68 | 64 |
| 243 | 222 | 155 | 171 | 157 | 146 | 140 | 133 | 125 | 104 | 70 | 63 |
| 243 | 237 | 222 | 167 | 158 | 158 | 158 | 158 | 149 | 116 | 95 | 63 |
| 243 | 243 | 237 | 230 | 224 | 224 | 225 | 226 | 216 | 158 | 108 | 102 |
| 243 | 243 | 242 | 242 | 242 | 242 | 242 | 243 | 237 | 222 | 158 | 102 |
| 243 | 243 | 242 | 242 | 242 | 242 | 242 | 243 | 243 | 237 | 222 | 150 |
| 243 | 243 | 242 | 242 | 242 | 242 | 242 | 243 | 243 | 243 | 237 | 243 |
| 243 | 243 | 242 | 242 | 242 | 242 | 242 | 243 | 243 | 243 | 243 | 243 |
| 243 | 243 | 243 | 242 | 242 | 242 | 242 | 244 | 243 | 243 | 243 | 243 |

FIG. 18

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 134 | 109 | 107 | 126 | 216 |
| 200 | 91  | 58  | 57  | 71  | 100 |
| 203 | 99  | 62  | 59  | 65  | 77  |
| 236 | 179 | 155 | 147 | 124 | 73  |
| 243 | 238 | 233 | 234 | 208 | 118 |
| 243 | 242 | 242 | 243 | 242 | 213 |
| 243 | 242 | 242 | 243 | 243 | 243 |

FIG. 20A

| 243 | 243 | 243 | 242 | 242 | 242 | 242 | 244 | 243 | 243 | 243 | 243 |
|---|---|---|---|---|---|---|---|---|---|---|---|
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 150 | 150 | 150 | 150 | 150 | 150 | 243 | 243 | 243 |
| 243 | 243 | 150 | 102 | 102 | 102 | 102 | 102 | 101 | 150 | 243 | 243 |
| 241 | 150 | 101 | 30 | 30 | 27 | 29 | 27 | 24 | 102 | 150 | 241 |
| 242 | 150 | 101 | 30 | 30 | 27 | 29 | 27 | 24 | 102 | 102 | 150 |
| 242 | 150 | 101 | 30 | 30 | 27 | 29 | 27 | 21 | 32 | 101 | 102 |
| 244 | 150 | 104 | 28 | 28 | 24 | 25 | 27 | 31 | 34 | 34 | 104 |
| 244 | 150 | 102 | 32 | 32 | 31 | 22 | 23 | 31 | 34 | 33 | 34 |
| 243 | 243 | 150 | 102 | 102 | 102 | 102 | 102 | 103 | 101 | 33 | 33 |
| 243 | 243 | 243 | 150 | 150 | 150 | 150 | 150 | 150 | 103 | 104 | 33 |
| 243 | 243 | 243 | 242 | 150 | 242 | 242 | 244 | 243 | 150 | 103 | 102 |
| 243 | 243 | 243 | 242 | 242 | 242 | 242 | 244 | 243 | 243 | 150 | 102 |
| 243 | 243 | 243 | 242 | 242 | 242 | 242 | 244 | 243 | 243 | 243 | 150 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |

FIG. 20B

| 243 | 243 | 243 | 242 | 242 | 242 | 242 | 244 | 243 | 243 | 243 | 243 |
|---|---|---|---|---|---|---|---|---|---|---|---|
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 237 | 230 | 224 | 224 | 225 | 226 | 231 | 237 | 243 | 243 |
| 243 | 237 | 222 | 167 | 158 | 158 | 158 | 158 | 167 | 222 | 237 | 243 |
| 243 | 222 | 153 | 163 | 147 | 135 | 132 | 142 | 151 | 153 | 222 | 243 |
| 241 | 166 | 128 | 55 | 43 | 41 | 42 | 40 | 51 | 109 | 158 | 241 |
| 242 | 158 | 110 | 43 | 29 | 27 | 28 | 26 | 34 | 85 | 69 | 150 |
| 242 | 158 | 105 | 43 | 29 | 27 | 27 | 26 | 29 | 44 | 60 | 102 |
| 244 | 158 | 110 | 42 | 28 | 26 | 25 | 26 | 29 | 36 | 46 | 104 |
| 244 | 167 | 125 | 56 | 44 | 42 | 38 | 39 | 43 | 42 | 41 | 34 |
| 243 | 222 | 154 | 161 | 144 | 132 | 123 | 118 | 112 | 94 | 46 | 33 |
| 243 | 237 | 222 | 161 | 152 | 152 | 158 | 158 | 149 | 105 | 87 | 33 |
| 243 | 243 | 237 | 224 | 178 | 219 | 225 | 226 | 216 | 158 | 101 | 102 |
| 243 | 243 | 242 | 236 | 236 | 236 | 242 | 243 | 237 | 222 | 158 | 102 |
| 243 | 243 | 242 | 242 | 242 | 242 | 242 | 243 | 243 | 237 | 222 | 150 |
| 243 | 243 | 242 | 242 | 242 | 242 | 242 | 243 | 243 | 243 | 237 | 243 |
| 243 | 243 | 242 | 242 | 242 | 242 | 242 | 243 | 243 | 243 | 243 | 243 |
| 243 | 243 | 243 | 242 | 242 | 242 | 242 | 244 | 243 | 243 | 243 | 243 |

FIG. 21A

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 125 | 92  | 89  | 116 | 216 |
| 200 | 75  | 28  | 27  | 48  | 95  |
| 203 | 83  | 35  | 32  | 38  | 56  |
| 236 | 175 | 145 | 139 | 115 | 50  |
| 243 | 235 | 217 | 234 | 208 | 116 |
| 243 | 242 | 242 | 243 | 242 | 213 |
| 243 | 242 | 242 | 243 | 243 | 243 |

FIG. 21B

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 123 | 83  | 80  | 112 | 216 |
| 200 | 63  | 8   | 6   | 31  | 87  |
| 203 | 73  | 16  | 12  | 19  | 41  |
| 236 | 175 | 145 | 139 | 111 | 34  |
| 243 | 235 | 217 | 234 | 208 | 112 |
| 243 | 242 | 242 | 243 | 242 | 213 |
| 243 | 242 | 242 | 243 | 243 | 243 |

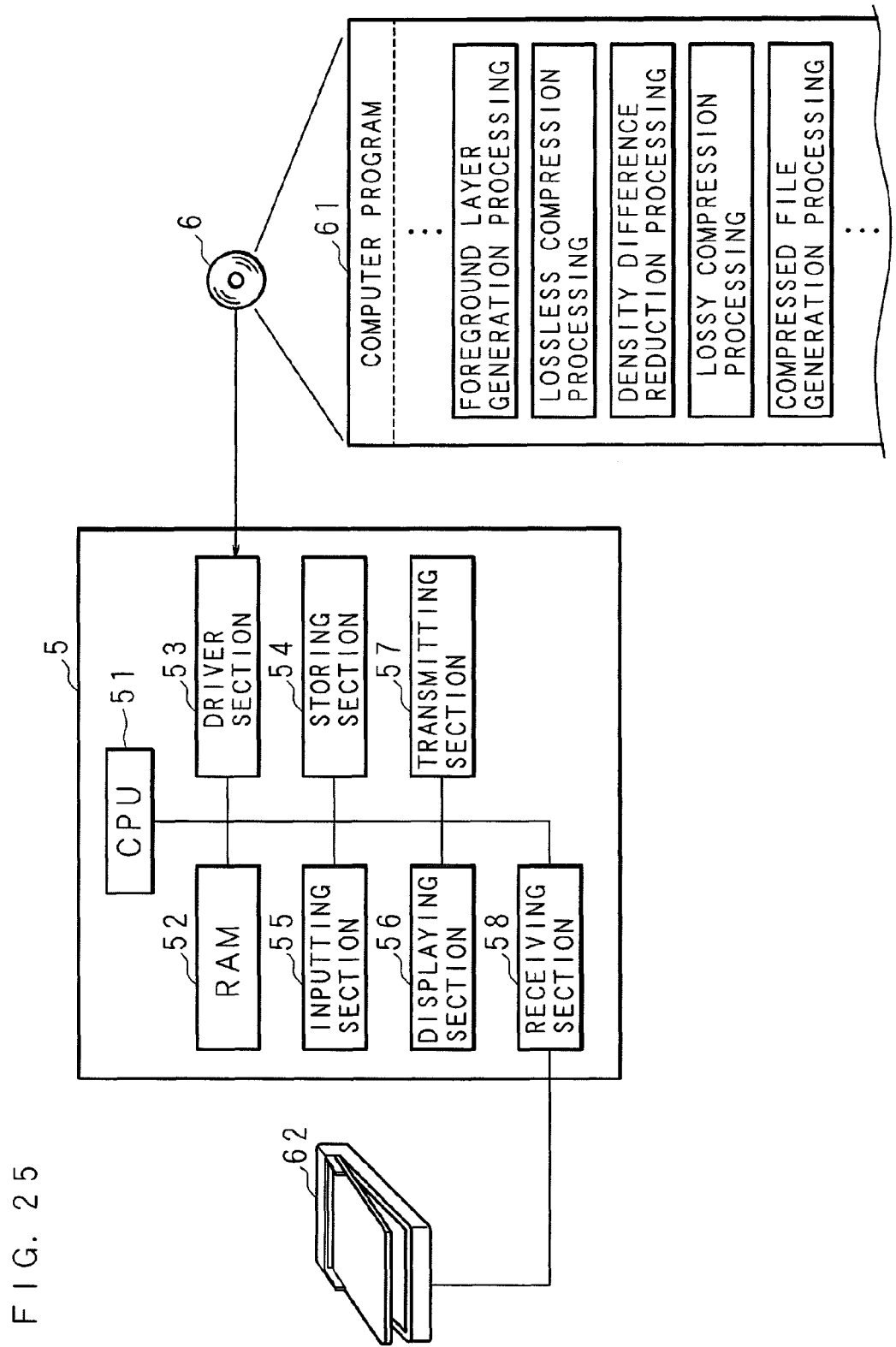

IMAGE COMPRESSING APPARATUS, COMPRESSED IMAGE OUTPUTTING APPARATUS, IMAGE COMPRESSION METHOD, AND RECORDING MEDIUM

CROSS-REFERENCE TO RELATED APPLICATIONS

This Nonprovisional application claims priority under 35 U.S.C. §119(a) on Patent Application No. 2010-8380 filed in Japan on Jan. 18, 2010, the entire contents of which are hereby incorporated by reference.

BACKGROUND

1. Technical Field

The present invention relates to an image compressing method for compressing image data. Furthermore, the present invention relates to an image compressing method, an image compressing apparatus, an image forming apparatus, computer program and a computer readable medium for separating an image into a text layer and a background layer and compressing each layer with a corresponding proper method in order to obtain the compressed image data.

2. Description of Related Art

It is well known about image processing method that a text image on a paper or the like is read optically to generate electronic image data. Such the image processing method is utilized in many fields, for example, a scanner apparatus, a facsimile apparatus, a copy apparatus and a multi-function apparatus having these functions. The generated image data may be transmitted with utilizing facsimile communication or e-mail communication. In addition, the generated image data may be stored on database and utilized for several purposes. When an image is optically read out and then image data is generated on the basis of the read image, the generated image data generally has a large data size. Thus, it is required performing compression of the image data for achieving efficient data transmission and efficient data storage.

There are compression methods based on layer separation, such as Mixed Raster Content (MRC), for implementing high compression rate. In such the compression method based on layer separation, a foreground mask is generated from the image and the foreground mask represents a text and/or a line art. The image is separated into a foreground layer and a background layer based on the generated foreground mask, the foreground layer and the background layer are compressed with utilizing respective proper compression method, and then high-compressed image is obtained finally. The foreground layer represents a text consisting of letters and/or a line art illustrated in the image, and is generally compressed by a lossless compression method, such as Joint Bi-level Image Experts Group (JBIG), Modified Modified Read (MMR) or Lempel Ziv Welch (LZW).

On the other hand, the background layer represents image contents other than the text and/or the line art, and is generally compressed by a lossy compression method, such as Joint Photographic Experts Group (JPEG). In a method disclosed by Japanese Patent Application Laid-Open No. 2003-18413, a color text image contains a plurality of letter regions, the color utilized in each text region is extracted, an inclusion image is generated that includes all the text regions illustrated with the same color, the inclusion image is compressed by the MMR, and the attached header is generated which contains the palette information of the inclusion image and the inclusion image information. In the case that an interest text region consisting of letters is illustrated with only one color, the interest text region is compressed by the MMR. In the case that an interest text region is illustrated with a plurality of colors, the interest text region is compressed by lossy compression. Then, the compression of the method results in the fact that the palette information and the text information are attached to the header. Japanese Patent Application Laid-Open No. 2003-18413 further discloses identifying text region of the color text image based on the text information, generating an image (corresponding to so-called background layer) whose identified text region is filled with a predetermined color, and compressing the generated image by the JPEG.

The lossy compression tends to degrade image quality greater than lossless compression. However, it is possible to control the lossy compression easier than the lossless compression. Thus, compression rate of the lossy compression may be increased in the case that preference is given to reduction in the data size and may be decreased in the case that preference is given to increase in the image quality. On the other hand, it is difficult to increase the compression rate of the lossless compression.

SUMMARY

Generally, a whole region of a text is extracted on the basis of the shape of text in order to separate an image into the text layer and the background layer. The whole region extraction based on the shape may be implemented by detecting a space as the text region between the rising edge of the text and the falling edge of the text, or by detecting a space as the text region whose density or color is represented by a value more than a predetermined threshold value. However, it is difficult to correctly perform such the extraction based on only the shape, because such the extraction requires several pre-processing and post-processing for achieving enhanced results to exclude elements other than the shape of text, such as photograph edges, halftone dots or noises. It may not cause a problem in the method disclosed by the Japanese Patent Application Laid-Open No. 2003-18413 in the case that the text region is extracted correctly. However, in the case that the text region is not extracted correctly, it causes problems combining the text layer into the background layer, squeezing the letter due to the lossy compression and degrading the visual recognition of the letter, in the method disclosed by the Japanese Patent Application Laid-Open No. 2003-18413.

The present invention has been devised in view of such situations. Its object is to provide an image compressing apparatus, a compressed image outputting apparatus, an image compression method, a computer program, and a recording medium in which a foreground layer is generated by extracting the contours of black texts used most frequently in various kinds of documents, so that recognition of texts contained in a compressed image is improved.

The image compressing apparatus according to the present invention is an image compressing apparatus for compressing an original document composed of a plurality of pixels, comprising a first image generating section detecting from the original document an edge of a text and/or a line drawing whose pixel color is black and then generating a first image in which the detected edge is expressed in the form of a binary image; a lossless compressing section performing lossless compression on the generated first image; a second image generating section generating a second image in which the color of the pixels contained in the original document is adjusted such that a density difference of color should be reduced between pixels contained in the edge detected by the first image generating section and the other pixels among the pixels contained in the original document; a lossy compressing section performing lossy compression on the generated second image; and a compressed file generating section generating a compressed file containing the first image having undergone lossless compression and the second image having undergone lossy compression.

The image compressing apparatus according to the present invention is an image compressing apparatus, wherein the second image generating section replaces a density indicating the density of color of a pixel contained in the edge detected by the first image generating section with an average of densities of pixels in the surroundings of the eight near neighbor pixels of said pixel.

The image compressing apparatus according to the present invention is an image compressing apparatus, wherein the second image generating section smoothes the densities of the pixels which are not contained in the edge detected by the first image generating section.

The image compressing apparatus according to the present invention is an image compressing apparatus, further comprising a resolution reducing section performing resolution reduction on the image having not yet undergone lossy compression.

The image compressing apparatus according to the present invention is an image compressing apparatus, further comprising a first density correcting section performing processing of correcting the density of each pixel onto the original document having not yet undergone the adjustment of the color of pixels by the second image generating section, such that the density of color of each pixel is increased; and a second density correcting section performing processing of correcting the density of each pixel onto the second image having not yet undergone lossy compression, such that the density of color of each pixel is increased.

The image compressing apparatus according to the present invention is an image compressing apparatus, wherein the first image generating section calculates an average of densities indicating the densities of color of the pixels contained in the detected edge, further comprising a color determining section setting the color of the first image having undergone lossless compression to be the calculated average.

The compressed image outputting apparatus according to the present invention is a compressed image outputting apparatus comprising an image compressing apparatus above described; an image receiving section receiving an original document to be compressed by the image compressing apparatus; and an outputting section outputting to the outside a compressed file generated by the image compressing apparatus.

The image compression method according to the present invention is an image compression method for compressing an original document composed of a plurality of pixels, comprising a step of detecting from the original document an edge of a text and/or a line drawing whose pixel color is black; a step of generating a first image in which the detected edge is expressed in the form of a binary image; a step of performing lossless compression on the generated first image; a step of generating a second image in which the color of the pixels contained in the original document is adjusted such that a density difference of color is reduced between pixels contained in the detected edge and the other pixels among the pixels contained in the original document; a step of performing lossy compression on the generated second image; and a step of generating a compressed file containing the first image having undergone lossless compression and the second image having undergone lossy compression.

The recording medium according to the present invention is a computer-readable recording medium carrying a computer program for causing a computer to execute processing of compressing an original document composed of a plurality of pixels, said computer program comprising: a step of detecting from the original document an edge of a text and/or a line drawing whose pixel color is black; a step of generating a first image in which the detected edge is expressed in the form of a binary image; a step of performing lossless compression on the generated first image; a step of generating a second image in which the color of the pixels contained in the original document is adjusted such that a density difference of color is reduced between pixels contained in the detected edge and the other pixels among the pixels contained in the original document; a step of performing lossy compression on the generated second image; and a step of generating a compressed file containing the first image having undergone lossless compression and the second image having undergone lossy compression.

According to the present invention, an image compressing apparatus compressing an original document composed of a plurality of pixels detects the edges of black texts or line drawings in an original document, then generates a foreground layer (a first image) in which the detected edges are expressed in the form of a binary image, then performs lossless compression on the foreground layer, then generates a background layer (a second image) in which the density difference of the edges of black texts or line drawings from the other parts in the original document is reduced, and then performs lossy compression on the background layer. Since the edges of black texts or line drawings are detected and adopted as a foreground layer, the contours of black texts or line drawings are separated clearly. Further, since the density difference is reduced, noise caused in association with compression is reduced at the time of lossy compression.

Further, according to the present invention, as for the pixels contained in the edges of black texts or line drawings, the average of densities of the surrounding pixels is adopted. By virtue of this, in the periphery of black texts or line drawings, the density difference of black texts or line drawings from the background is reduced.

Further, according to the present invention, as for the pixels other than the edges of black texts or line drawings, smoothing of the density is performed. This reduces fluctuation of the density in the areas other than the periphery of black texts or line drawings.

Further, according to the present invention, lossy compression of the background layer is performed after resolution reduction. This reduces the size of the compressed file.

Further, according to the present invention, density correction for enhancing the density of pixels is performed on the original document having not yet undergone density difference reduction and on the background layer having not yet undergone lossy compression. This suppresses that the density of color in the image is reduced owing to the image processing at the time of image compression.

Further, according to the present invention, the average of black densities in the edges of the detected black texts or line drawings is adopted as the color of the foreground layer expressing the edges of the black texts or the line drawings. By virtue of this, the color of the black texts or the line drawings in the image obtained by decompressing the compressed file is set to be black close to the black in the background layer.

Further, according to the present invention, in the image obtained by decompressing the compressed file, the contours of black texts or line drawings are expressed clearly, and at the same time, noise caused in association with compression is reduced. This suppresses the occurrence of the situation that texts or line drawings become blurred so that their visual recognition is degraded. Thus, visual recognition of black texts or line drawings is improved. As such, since visual recognition is improved in black texts used most frequently in various kinds of documents, the present invention provides such an excellent effect that high visual recognition of texts is obtained even in an image obtained by compressing a document and that reuse of the document becomes easily.

The above and further objects and features will more fully be apparent from the following detailed description with accompanying drawings.

BRIEF DESCRIPTION OF THE SEVERAL VIEWS OF THE DRAWINGS

FIGS. 8A and 8B are conceptual diagrams illustrating an example that the edge of a black text is detected as a result of the processing of filtering and the processing of judging black pixels.

FIGS. 9A and 9B are conceptual diagrams illustrating an example that the edge of a black text is detected as a result of the processing of filtering and the processing of judging black pixels.

FIG. 10 is a conceptual diagram illustrating an example that the edge of a black text is detected as a result of the processing of filtering and the processing of judging black pixels.

FIG. 12 is a schematic diagram illustrating an example of a foreground layer.

FIG. 14 is a conceptual diagram illustrating an example of a filter employing a weighted mean.

FIG. 15 is a conceptual diagram illustrating an example of a smoothing filter.

FIGS. 16A and 16B are conceptual diagrams illustrating an example of a processing result obtained by a density difference reduction section.

FIG. 17 is a conceptual diagram illustrating an example of a processing result obtained by a density difference reduction section.

FIG. 18 is a conceptual diagram illustrating an example of a result of resolution reduction.

FIGS. 20A and 20B are conceptual diagrams illustrating an example of a processing result of density correction performed by a density correction section.

FIGS. 21A and 21B are conceptual diagrams illustrating an example of a processing result of density correction performed by a density correction section.

FIG. 25 is a block diagram showing an example of inner components included in the image compressing apparatus according to embodiment 3.

DETAILED DESCRIPTION

The present invention is described below in detail with reference to the drawings illustrating the embodiments.

Embodiment 1

Figure 1:
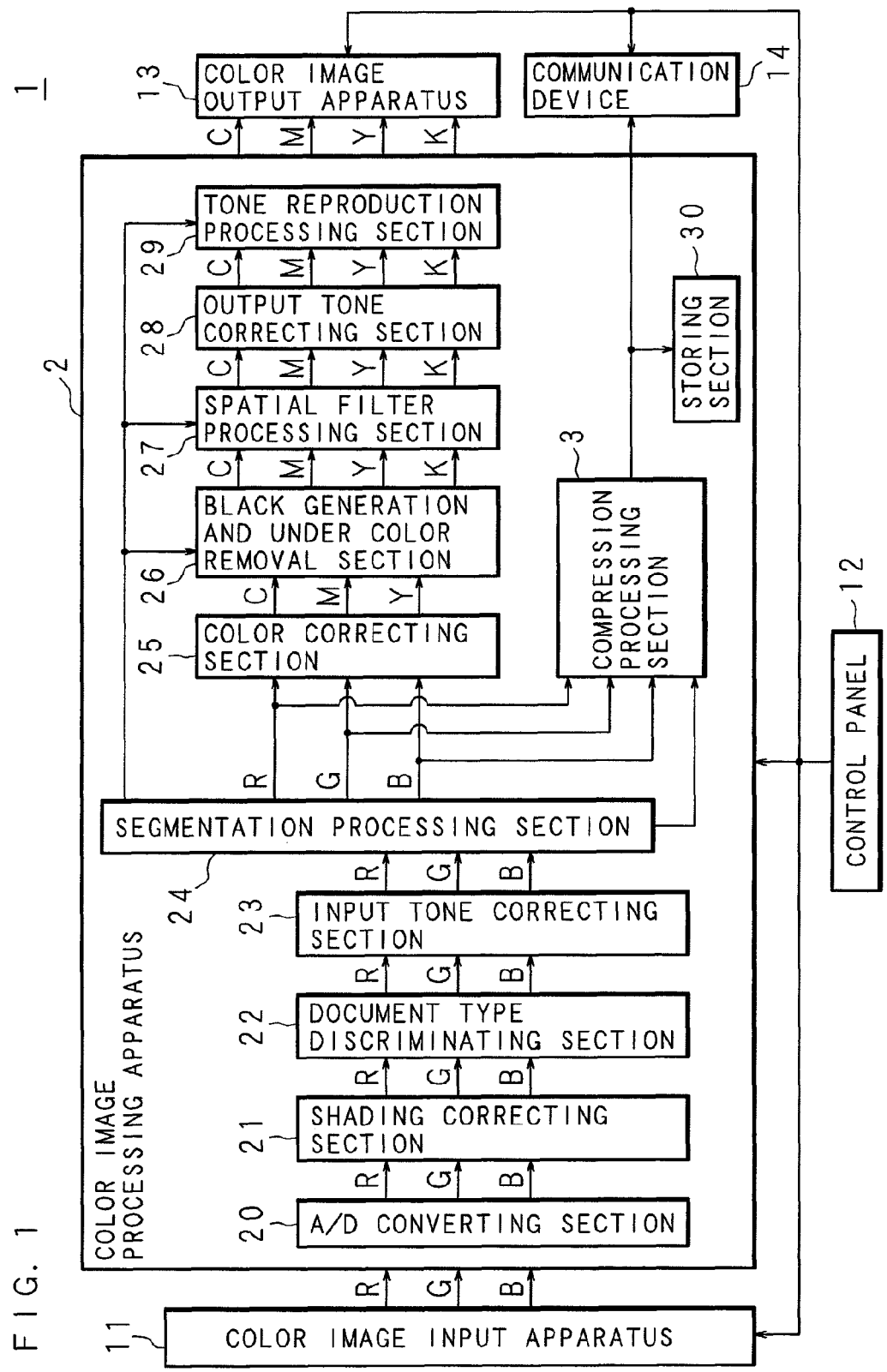
FIG. 1 is a block diagram showing functional components included by the image forming apparatus according to the embodiment 1.

The embodiment 1 is illustrated in the context of the image compressing apparatus according to the present invention included in an image forming apparatus that forms a color image. The image forming apparatus 1 corresponds to the compressed image outputting apparatus of the present invention. FIG. 1 is a block diagram showing functional components included by the image forming apparatus according to the embodiment 1. The image forming apparatus 1 according to the present invention is a digital multi-function printer provided with color copy function, color scanner function and the like. The image forming apparatus 1 includes a color image input apparatus 11 (image receiving section) that optically reads out a color image from a document. The color image input apparatus 11 is connected to a color image processing apparatus 2 that generates image data and compressed image data which are based on the color image read out by the color image input apparatus 11. The color image processing apparatus 2 is connected to a color image output apparatus 13 that outputs a color image which is based on the image data generated by the color image processing apparatus 2. Furthermore, the color image processing apparatus 2 is connected to a communication device 14 (outputting section) that externally transmits the compressed image data generated by the color image processing apparatus 2. A control panel 12 is connected to the color image input apparatus 11, the color image processing apparatus 2, the color image output apparatus 13 and the communication device 14, in order to receive an instruction from a user.

The image forming apparatus 1 performs several processes that are controlled by a Central Processing Unit (CPU: not shown). The CPU of the image forming apparatus 1 can perform data communication through a network card (not shown) and a Local Area Network (LAN) cable (not shown) with a computer, another digital multi-function printer and the like that are connected into the communication network.

Next, it will be described about each component of the image forming apparatus 1. The control panel 12 is configured with a receiving section and a displaying section. The receiving section is a touch screen, numeric keypads or the like, and receives an instruction for setting an operating mode of the image forming apparatus 1, an instruction for controlling the operation of the image forming apparatus 1 and the like from a user. The displaying section is a liquid crystal display or the like and displays information required for a user to input an instruction.

The color image input apparatus 11 is constructed from a color scanner provided with a photosensor such as a CCD (Charge Coupled Device). In the color image input apparatus 11, a reflected light image from a document in which a color image is recorded on a recording sheet such as a paper sheet is decomposed into individual color components of RGB (R: red, G: green, B: blue), then read by the photo sensor so as to be converted into analog signals of RGB, and then outputted to the color image processing apparatus 2.

The color image processing apparatus 2 includes an A/D converting section 20, a shading correcting section 21, a document type discriminating section 22, an input tone correcting section 23 and a segmentation processing section 24, which perform image processing described later on the input RGB analog signal from the color image input apparatus 11. The color image processing apparatus 2 generates image data consisting of RGB digital signal (abbreviation: RGB signal). Hereinafter, the intensity of RGB signal is represented by R, G, B, respectively.

Furthermore, the color image processing apparatus 2 includes a color correcting section 25, a black generation and under color removal section 26, a spatial filter processing section 27, an output tone correcting section 28 and a tone reproduction processing section 29, which perform image processing described later on RGB signal from segmentation processing section 24. The color image processing apparatus 2 generates image data consisting of CMYK digital signal (C: cyan; M: magenta; y: yellow; K: black), and outputs the generated image data as stream toward the color image output apparatus 13. The color image processing apparatus 2 may temporally store the generated image data on a storing section 30 that is a non-volatile storage device, such as hard disk, before outputting the generated image data to the color image output apparatus 13.

The color image output apparatus 13 outputs a color image based on the image data input from the color image processing apparatus 2, and then the color image is recorded on the recording sheet, such as a paper, by thermal transfer printing, electrophotography, ink-jet printing or the like. Alternatively, the image forming apparatus 1 may include a monochrome image output apparatus that records and outputs a monochrome image on a recording sheet, instead of the color image output apparatus 13. In the alternative embodiment, the color image processing apparatus 2 converts image data of color image into image data of monochrome image, and then outputs the converted image data to the monochrome image output apparatus.

In the color image processing apparatus 2, the compression processing section 3 performs an image compressing method according to the present invention (described later) on the RGB signal output by the segmentation processing section 24. The color image processing apparatus 2 generates a compression file containing the compressed image data and outputs the generated compression file to the communication device 14. The compression processing section 3 can work as the image compressing apparatus according to the present invention. The color image processing apparatus 2 may temporally store the generated compression file on the storing section 30 before outputting the generated compression file to the color image output apparatus 13.

The communication device 14 consists of a network card, a modem or the like, and can connect to communication network, such as public line, Local Area Network (LAN) or Internet (not shown). The communication device 14 transmits the compression file through the communication network to the outside with utilizing communication method such as a facsimile or an e-mail. For example, in the case that a "scan to e-mail mode" is selected on the control panel 12, the communication device 14 attaches the compression file to the e-mail and then transmits the e-mail to a predetermined destination.

In the case that the communication device 14 performs the facsimile communication, the CPU of the image forming apparatus 1 performs communication procedure with the destination apparatus through the communication device 14. After proper communication condition is established, the CPU of the image forming apparatus 1 sequentially transmit the compression file to a destination device, on which required processing has been performed, such as modification of compression format.

In the case that the communication device 14 receives a facsimile, the CPU of the image forming apparatus 1 receives the compression file transmitted from an originating communication device during performing the communication procedure with the originating communication device through the communication device 14. The CPU of the image forming apparatus 1 inputs the received compression file into the color image processing apparatus 2. The color image processing apparatus 2 performs decompression processing on the compression file received through a decompression processing section (not shown). The color image processing apparatus 2 performs, according to need, image rotation processing, resolution conversion processing and/or the like on the image data obtained by the decompression of the compression file. These processing may be performed at a not shown processing section. Further, the color image processing apparatus 2 performs on the obtained image data, according to need, correction processing of the output tone on the output tone correcting section 28 and halftone processing of the output tone on the tone reproduction processing section 29. Furthermore, the color image processing apparatus 2 outputs the image data on which several image processing have been performed toward the color image output apparatus 13, and then the color image output apparatus 13 outputs a color image based on the image data output from the color image processing apparatus 2.

Next, it will be described about image processing performed by the color image processing apparatus 2. The A/D converting section 20 receives the RGB analog signal input from the color image input apparatus 11 to the color image processing apparatus 2, converts the received RGB analog signal into RGB digital signal, and outputs the converted RGB signal (i.e., RGB digital signal) to the shading correcting section 21.

The shading correcting section 21 performs several processing on the RGB signal input from the A/D converting section 20 for correcting distortions caused in an image lighting system, an image focusing system and an image sensing system of the color image input apparatus 11. Then, the shading correcting section 21 outputs the corrected RGB signal toward the document type discriminating section 22.

The document type discriminating section 22 converts the reflectivity signals of RGB inputted from the shading correction section 21, into density (pixel value) signals expressing the densities of each color of RGB, and then performs document type discrimination processing of determining the mode of the document like a text, a printed picture, and a photograph. In the case that the discrimination processing of document type is based on the user's manual setting through the control panel 12, the document type discriminating section 22 outputs the RGB signal obtained by conversion into density signals expressing the densities of RGB colors toward the input tone correcting section 23. The results of the discrimination processing affect the following image processing.

The input tone correcting section 23 performs adjustment processing of image quality on the RGB signal, such as adjustment of color balance, removal of page background density and adjustment of contrast. The input tone correcting section 23 then outputs the processed RGB signal to the segmentation processing section 24.

The segmentation processing section 24 separates pixels of the image represented by the RGB signal, which has been input by the input tone correcting section 23, into the pixel of black text region, the pixel of halftone dot region and the pixel of photograph region. As the processing of detecting a black text area, the segmentation processing section 24 performs the processing of detecting the edges of texts and the processing of judging black pixels. The segmentation processing section 24 further outputs segmentation class signal, which is based on the separation results and represents a corresponding region of the interest pixel, toward the compression processing section 3, the black generation and under color removal section 26, the spatial filter processing section 27 and the tone reproduction processing section 29. The segmentation processing section 24 furthermore outputs the RGB signal input by the input tone correcting section 23 toward the color correcting section 25 and the compression processing section 3. Alternatively, the segmentation processing section 24 may not output the segmentation class signal to the compression processing section 3.

The color correcting section 25 converts the RGB signal input by the segmentation processing section 24 into CMY digital signal (abbreviation: CMY signal). The color correcting section 25 performs, for reproducing faithful color, a process for removing color impurity on the basis of the spectral characteristics of color materials of CMY including unnecessary absorbed components. The color correcting section 25 then outputs the processed CMY signal to the black generation and under color removal section 26.

The black generation and under color removal section 26 performs black generation processing for generating black (K) signal based on the CMY signal input by the color correcting section 25, and performs new CMY signal generation processing for generating new CMY signal that is the input CMY signal from which the generated K signal by the black generation processing is subtracted. The CMY referring to three color signal is converted into CMYK four color digital signal (abbreviation; CMYK signal). The black generation and under color removal section 26 then outputs the CMYK signal, which is converted from the CMY signal, toward the spatial filter processing section 27.

It is known about skeleton black method as an example for the black generation processing performed by the black generation and under color removal section 26. In the case that the skeleton black method is utilized, that the input output characteristics of skeleton curve is represented by $y=f(x)$, that the input data are represented by C, M and Y, that the output data are represented by C', M', Y' and K', and that Under Color Removal (UCR) rate is represented by a $(0<\alpha<1)$, the C', the M', the Y' and the K' obtained after the processing of the black generation and under color removal section 26 are defined by the following formulas:

$$K'=f(\min(C,M,Y)) \quad (1)$$

$$C'=C-\alpha K' \quad (2)$$

$$M'=M-\alpha K' \quad (3)$$

$$Y'=Y-\alpha K' \quad (4)$$

The UCR rate a $(0<\alpha<1)$ shows the amount of CMY signal deleted by replacement of K signal. The formula (1) means that the K signal is generated in accordance with the smallest signal intensity among the signal intensities of the C signal, the M signal and the Y signal.

The spatial filter processing section 27 performs spatial filter processing on the image represented by the CMYK signal input from the black generation and under color removal section 26. The spatial filter processing is for correcting the characteristic of spatial frequency and is based on the segmentation class signal input from the segmentation processing section 24. The spatial filter processing works to improve blur of image or degradation of image graininess. For example, in a text region separated by the segmentation processing section 24, the spatial filter processing section 27 performs the special filter process by using a filter for sharpening a high frequency component so as to improve the reproducibility of a text. Alternatively, in a halftone dot region separated by the segmentation processing section 24, the spatial filter processing section 27 performs a low-pass filtering process for removing an input halftone component. The spatial filter processing section 27 then outputs the processed CMYK signal toward the output tone correcting section 28.

The output tone correcting section 28 performs, on the CMYK signal input from the spatial filter processing section 27, an output tone correction process on the basis of a halftone area ratio, that is, a characteristic value of the color image output apparatus 13. The output tone correcting section 28 outputs the processed CMYK signal toward the tone reproduction processing section 29.

The tone reproduction processing section 29 performs halftone processing on the CMYK signal input from the output tone correcting section 28. The halftone processing is based on the segmentation class signal input from the segmentation processing section 24. For example, the tone reproduction processing section 29 utilizes a high resolution screen suitable for reproducing high frequency component, and performs binarization processing or multi-level dithering processing on the region of pixels separated into the text region by the segmentation processing section 24. For example, the tone reproduction processing section 29 utilizes a screen suitable for tone reproduction, and performs binarization processing or multi-level dithering processing on the region of pixels separated into the halftone dot region by the segmentation processing section 24. The tone reproduction processing section 29 then outputs the processed image data toward the color image output apparatus 13.

Next, it will be described about configuration of the compression processing section 3 and about image processing performed by the compression processing section 3. The compression processing section 3 generates a compression file based on the image data of the RGB signal input from the segmentation processing section 24, with utilizing the image compressing method according to the present invention.

The compression processing section 3 inputs image data representing the original color image that is configured with matrix arrangement of pixels. The compression processing section 3 generates a foreground layer (a first image) and a background layer (a second image) from the original document, then converts the foreground layer into a binary image, then performs lossless compression by MMR or the like onto the foreground layer, and then performs lossy compression by JPEG or the like onto the background layer. The compression processing section 3 then performs the lossless compression (e.g., MMR) on the foreground layer and performs the lossy compression (e.g., JPEG) on the background layer. Further, the compression processing section 3 generates one file containing the foreground layer compressed by lossless compression, the background layer compressed by the lossy compression and the decompression information for decompressing the compressed foreground layer and the compressed background layer to obtain image data for color image. This file is the compression file. This decompression information may consist of compression format information, index color table (IC table) and the like. Such the compression file has smaller data amount and prevents degradation of image quality greater than a file containing data that is directly compressed from data of the original color image, and then a file containing data that is directly compressed from the foreground layer and data that is directly compressed from the background layer. Furthermore, this embodiment is enough to have lossless compression means for binary image (foreground layer) and lossy compression means for background layer. Therefore, this embodiment works even without three or more types of compression means.

Figure 2:
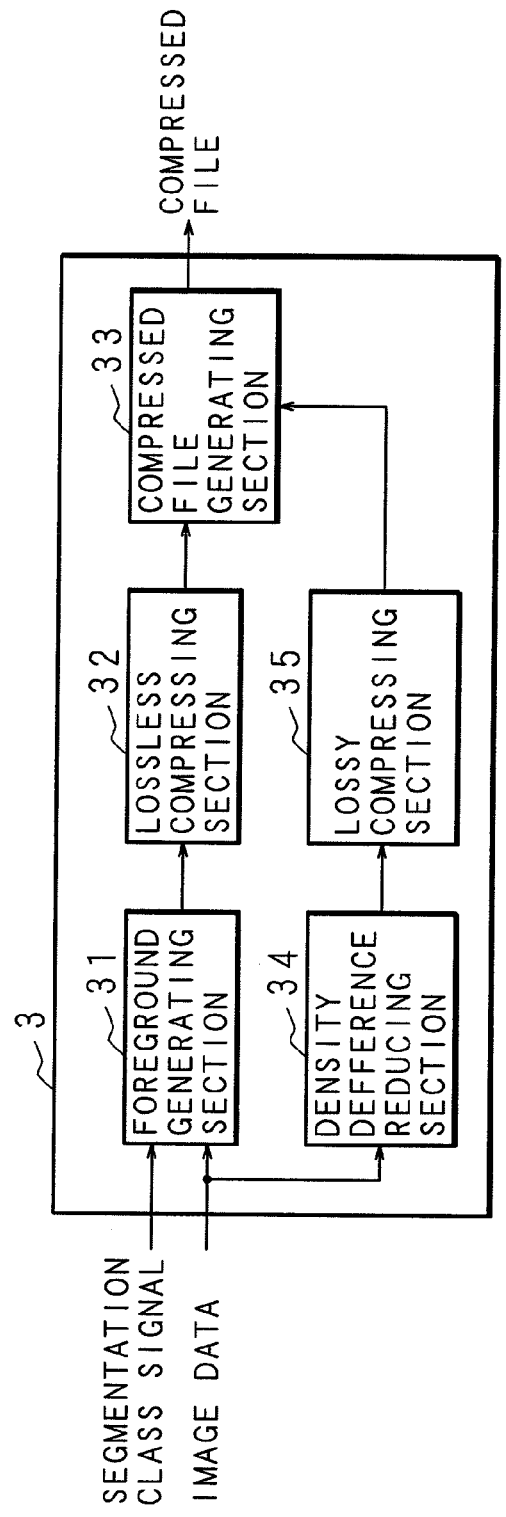
FIG. 2 is a block diagram illustrating an example of an internal configuration of a compression process section.

FIG. 2 is a block diagram illustrating an example of the internal configuration of the compression processing section 3. The compression processing section 3 has: a foreground generation section 31 (a first image generating section) generating a foreground layer expressing a black text; a lossless compressing section 32 compressing the foreground layer; a density difference reducing section 34 (a second image generating section) performing the processing of reducing the density difference of the foreground layer from the other parts in the image; a lossy compressing section 35 compressing the background layer; and a compressed file generating section 33 (a color determining section). The segmentation class signals from the segmentation processing section 24 and the image data composed of the RGB signals are inputted to the foreground generation section 31 and the density difference reducing section 34. The foreground generation section 31 extracts the signals of a black text area from the segmentation class signals, and then generates a binary image in which pixels corresponding to the edge of a black texts are expressed in a binary form, so that a foreground layer is generated. The foreground generation section 31 outputs the generated foreground layer to the lossless compressing section 32. Then, the lossless compressing section 32 performs lossless compression on the foreground layer inputted from the foreground generation section 31.

On the basis of the signals of the black text area included in the segmentation class signals, the density difference reducing section 34 identifies pixels contained in the black text area among the pixels contained in the original document, and then performs the processing of reducing the density difference of the pixels in the black text area from the other pixels. Specifically, for the pixels on the black text edge, the density difference reducing section 34 performs filtering such that the density difference is reduced relative to the pixels near neighbor the edge. Further, the density difference reducing section 34 performs smoothing of the density onto for the pixels which are not contained in the black text area. As a result of the filtering and the smoothing for the original document, the density difference reducing section 34 generates a background layer and then outputs the background layer to the lossy compressing section 35. The lossy compressing section 35 performs lossy compression on the background layer with a higher compression rate than that of the lossless compressing section 32.

The lossless compressing section 32 outputs to the compressed file generating section 33 the lossless compression data obtained by lossless compression of the foreground layer, while the lossy compressing section 35 outputs to the compressed file generating section 33 the lossy compression data obtained by lossy compression of the background layer. Further, the lossless compressing section 32 and the lossy compressing section 35 inputs necessary information like information indicating the compression format, to the compressed file generating section 33. The compressed file generating section 33 combines into a single file the lossless compression data, the lossy compression data, and the decompression information such as the IC table and the like, so as to achieve the processing of generating the compressed file.

Here, in a case that segmentation class signals that contain signals indicating a black text area are not inputted from the segmentation processing section 24, the foreground generation section 31 performs the processing of detecting the edge of a text and the processing of judging black pixels, so as to perform the processing of detecting a black text area. This corresponds to a case that the color image processing apparatus 2 is operated without the use of the segmentation processing section 24 or alternatively a case that the color image processing apparatus 2 does not have the segmentation processing section 24. As the processing of detecting the edge of a text, the foreground generation section 31 performs general edge detection filtering such as Sobel's edge detection filter. Further, as the processing of detecting black pixels, the foreground generation section 31 performs such processing that a pixel in the original document is selected sequentially and then when R=G=B<TH1, the pixel of interest is judged as an black pixel. Here, TH1 denotes a threshold value for RGB signal intensities used for judging that the color of the pixel of interest is black. Here, TH1 is stored in advance in the foreground generation section 31. As an alternative method of the processing of detecting black pixels, the foreground generation section 31 may judge that the pixel of interest is a black pixel when each of |R-G|, |G-B|, and |B-R| is smaller than a threshold value TH2 and each of R, G, and B is smaller than TH1. Here, TH2 is a value smaller than TH1, and stored in advance in the foreground generation section 31. When detecting the black text area, the foreground generation section 31 outputs a signal indicating a black text area to the density difference reducing section 34. Then, on the basis of the signal indicating a black text area inputted from the foreground generation section 31, the density difference reducing section 34 performs the processing of identifying the pixels contained in the black text area.

Figure 3:
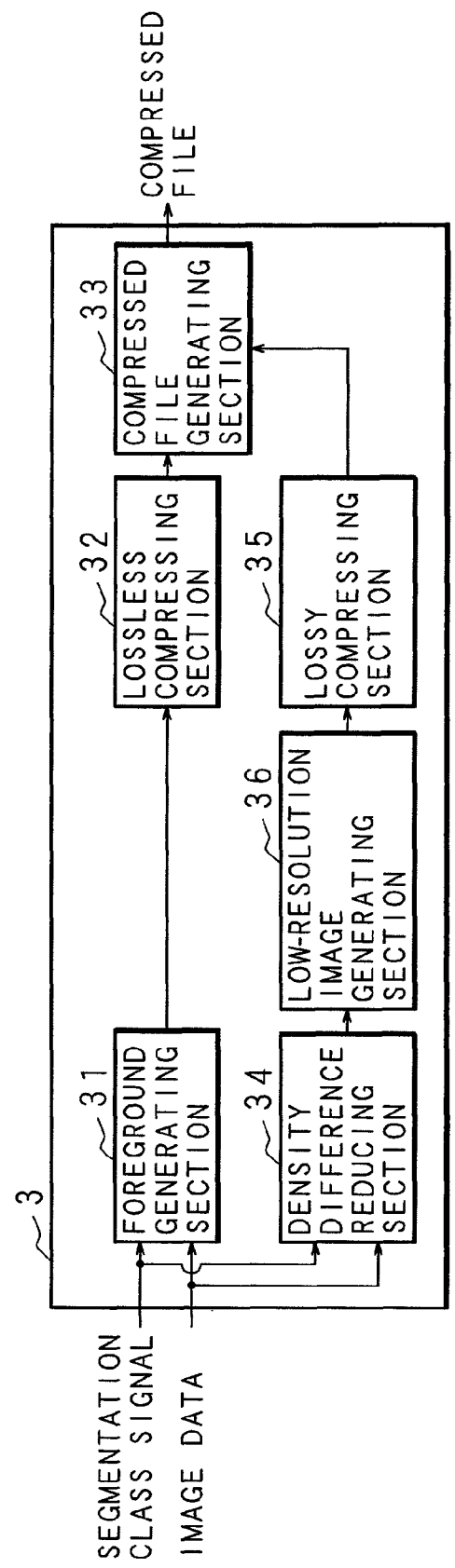
FIG. 3 is a block diagram illustrating another example of an internal configuration of a compression process section.
Figure 4:
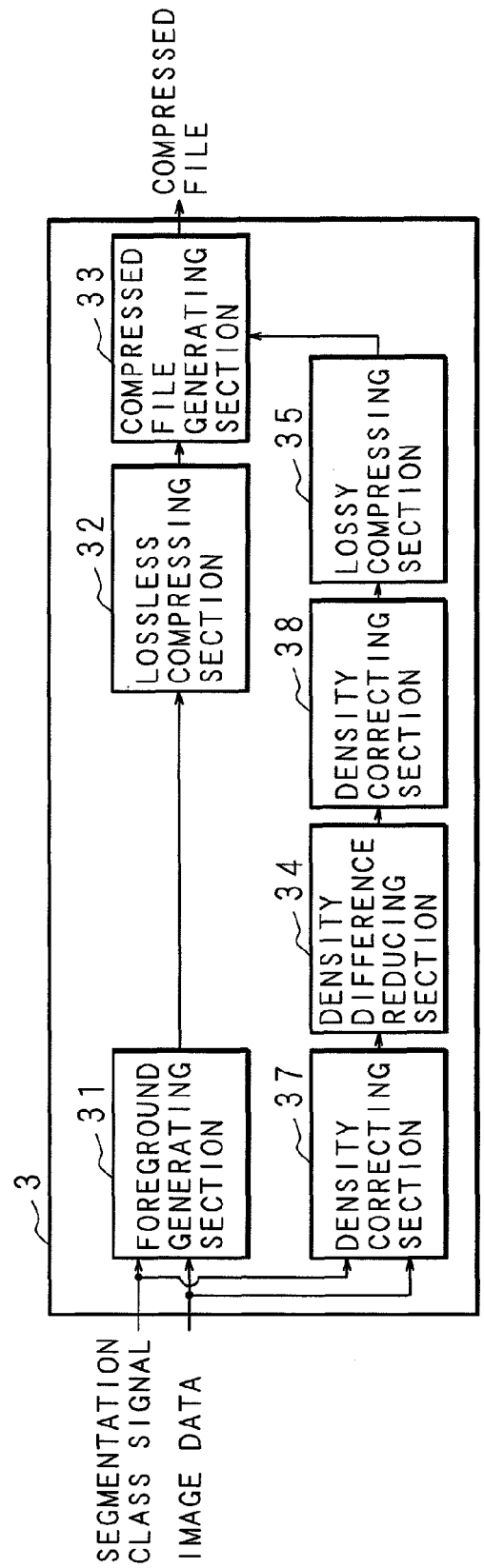
FIG. 4 is a block diagram illustrating another example of an internal configuration of a compression process section.
Figure 5:
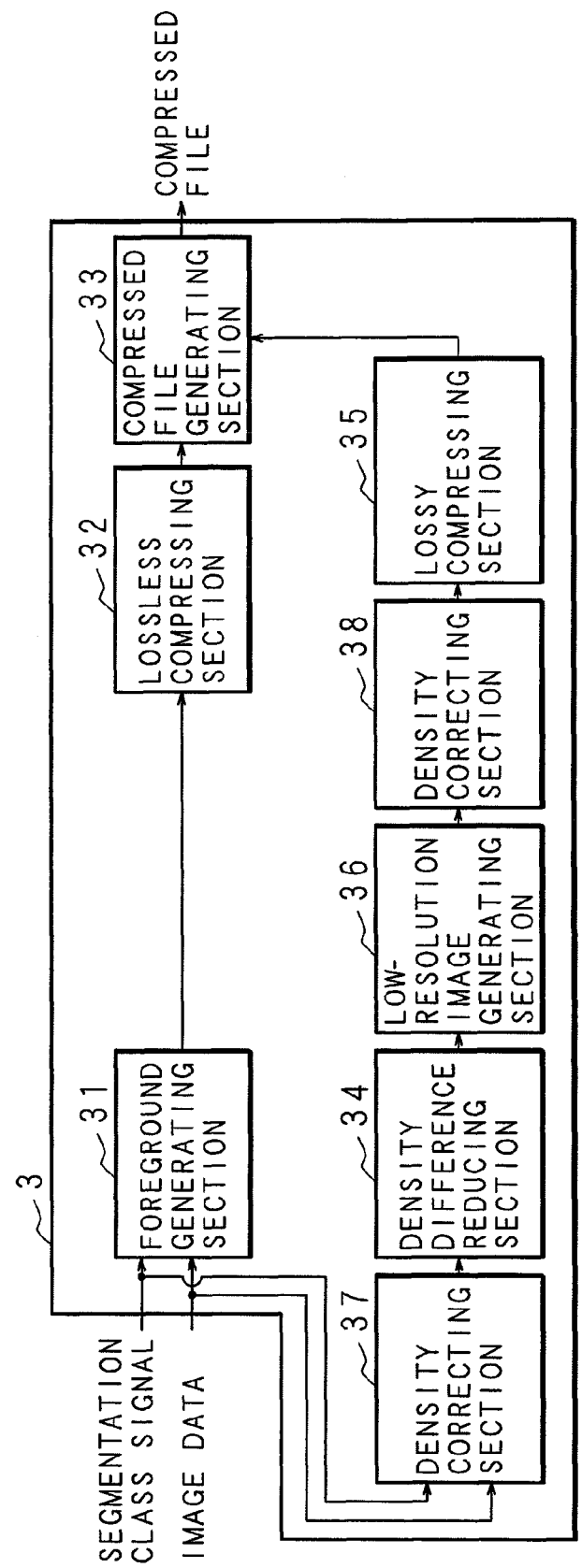
FIG. 5 is a block diagram illustrating another example of an internal configuration of a compression process section.

FIGS. 3, 4 and 5 are block diagrams each illustrating another example of the internal configuration of the compression processing section 3. FIG. 3 illustrates a mode that the compression processing section 3 reduces the resolution of the background layer. The compression processing section 3 has a low-resolution image generating section 36 performing resolution reduction on the background layer, in addition to the foreground generation section 31, the lossless compressing section 32, the compressed file generating section 33, the density difference reducing section 34, and the lossy compressing section 35. The density difference reducing section 34 outputs the background layer to the low-resolution image generating section 36. Then, the low-resolution image generating section 36 converts into a low resolution image the background layer inputted from the density difference reducing section 34, and then outputs to the lossy compressing section 35 the background layer having undergone resolution reduction. The lossy compressing section 35 performs lossy compression on the background layer inputted from the low-resolution image generating section 36, and then outputs the lossy compression data to the compressed file generating section 33. The foreground generation section 31, the lossless compressing section 32, and the compressed file generating section 33 perform processing similar to those described above. By virtue of the resolution reduction for the background layer, the data size of the compressed file is reduced further.

FIG. 4 illustrates a mode that the compression processing section 3 performs density correction on the background layer. The compression processing section 3 has density correction sections 37 (a first density correcting section) and 38 (a second density correcting section) performing density correction of the background layer, in addition to the foreground generation section 31, the lossless compressing section 32, the compressed file generating section 33, the density difference reducing section 34, and the lossy compressing section 35. The image data and the segmentation class signals from the segmentation processing section 24 are inputted to the foreground generation section 31 and the density correcting section 37. The density correcting section 37 performs the processing of density correction for enhancing the densities of the pixels contained in the original document. The density correcting section 37 outputs the image data having undergone density correction to the density difference reducing section 34. Then, the density difference reducing section 34 generates a background layer on the basis of the image data inputted from the density correcting section 37, and then outputs the background layer to the density correcting section 38. The density correcting section 38 performs the processing of density correction for enhancing the densities of the pixels contained in the background layer inputted from the density difference reducing section 34, and then outputs to the lossy compressing section 35 the background layer having undergone density correction. The lossy compressing section 35 performs lossy compression on the background layer inputted from the density correcting section 38, and then outputs the lossy compression data to the compressed file generating section 33. The foreground generation section 31, the lossless compressing section 32, and the compressed file generating section 33 perform processing similar to those described above.

FIG. 5 illustrates a mode that the compression processing section 3 performs resolution reduction and density correction on the background layer. The compression processing section 3 has a low-resolution image generating section 36 and density correction sections 37 and 38, in addition to the foreground generation section 31, the lossless compressing section 32, the compressed file generating section 33, the density difference reducing section 34, and the lossy compressing section 35. The image data and the segmentation class signals from the segmentation processing section 24 are inputted to the foreground generation section 31 and the density correcting section 37. Then, the density correcting section 38 performs the processing of density correction, and then outputs the image data having undergone density correction to the density difference reducing section 34. The density difference reducing section 34 generates a background layer on the basis of the image data inputted from the density correcting section 37, and then outputs the background layer to the low-resolution image generating section 36. The low-resolution image generating section 36 converts into a low resolution image the background layer inputted from the density difference reducing section 34, and then outputs to the density correcting section 38 the background layer having undergone resolution reduction. The density correcting section 38 performs the processing of density correction on the background layer inputted from the low-resolution image generating section 36, and then outputs to the lossy compressing section 35 the background layer having undergone density correction. The lossy compressing section 35 performs lossy compression on the background layer inputted from the density correcting section 38, and then outputs the lossy compression data to the compressed file generating section 33. The foreground generation section 31, the lossless compressing section 32, and the compressed file generating section 33 perform processing similar to those described above.

Figure 6:
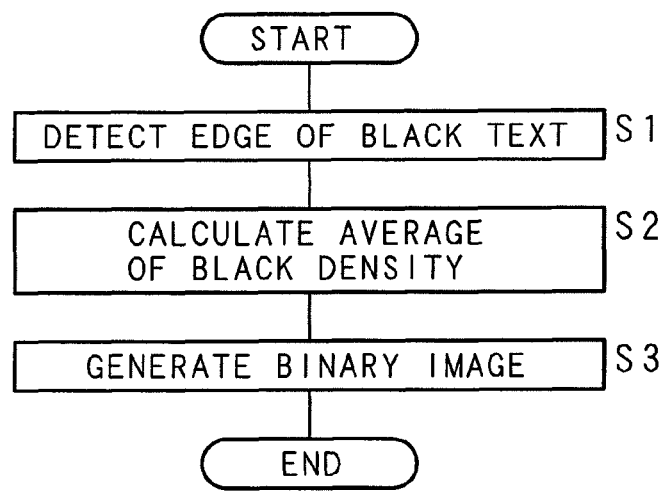
FIG. 6 is a flow chart illustrating a procedure of processing performed by a foreground layer generation section.
Figures 7A, 7B, 7C:
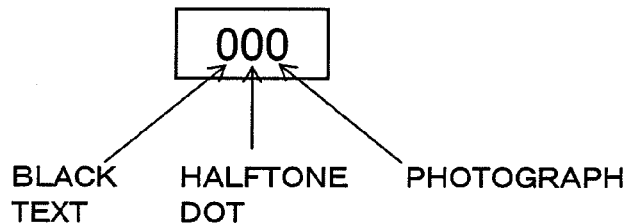
FIGS. 7A, 7B and 7C are conceptual diagrams illustrating an example of detection of the edge of a black text.

Next, processing performed by the foreground generation section 31 is described below. FIG. 6 is a flow chart illustrating the procedure of processing performed by the foreground generation section 31. On the basis of the text area signal indicating that pixels are contained in a text area among the segmentation class signals inputted from the segmentation processing section 24, the foreground generation section 31 detects the edge of a black text contained in the original document expressed by the image data inputted from the segmentation processing section 24 (S1). FIGS. 7A, 7B and 7C are conceptual diagrams illustrating an example of detection of the edge of a black text. FIG. 7A illustrates an example of the format of the segmentation class signal. In the example illustrated in FIG. 7A, the segmentation class signal is of three bits. Then, the leftmost bit indicates a black text area, the middle bit indicates a halftone dot area, and the rightmost bit indicates a photograph area. When any bit is 1, it is indicated that the pixel is contained in the area corresponding to the bit. When any bit is 0, it is indicated that the pixel is not contained in the area corresponding to the bit. FIG. 7B illustrates an example that a segmentation class signal is assigned to each pixel in the original document. Pixels whose black text area bit is 1 are extracted from among the pixels contained in the original document, so that a black text area in the original document is detected. Further, among the extracted pixels, pixels whose two near neighbor pixels, four near neighbor pixels, or eight near neighbor pixels belong to a black text area are removed. Then, the remained pixels are those corresponding to the edge of a black text, and hence the edge of a black text is detected. FIG. 7C illustrates a situation that among the pixels illustrated in FIG. 7B, pixels corresponding to the edge of a black text are indicated as 1 and the other pixels are indicated as 0. As a result of step S1, a binary mask expressing the edge of a black text is obtained as illustrated in FIG. 7C.

Here, in a mode that segmentation class signals are not inputted from the segmentation processing section 24, the foreground generation section 31 at step S1 performs the processing of detecting the edge of a text and the processing of judging black pixels, so as to perform the processing of detecting the edge of a text. FIGS. 8A, 8B, 9A, 9B and 10 are conceptual diagrams illustrating an example that the edge of a black text is detected as a result of the processing of filtering and the processing of judging black pixels. FIG. 8A illustrates an image in which the density of each pixel is indicated by a value from 0 to 255. FIG. 8B illustrates two kinds of Sobel's edge detection filters of 3×3 for horizontal and vertical directions. FIG. 9A illustrates a result that the filtering results obtained by applying the two kinds of Sobel's edge detection filters illustrated in FIG. 8B onto the image illustrated in FIG. 8A are added to each other and then their absolute values are calculated. Then, the value corresponding to each pixel corresponding to a part other than a text edge is 0. Thus, each pixel having a greater value is detected as a text edge. Then, the foreground generation section 31 substitutes each value greater than a given threshold value to be 1 and each value smaller than or equal to the threshold value to be 0, so as to achieve binarization of the edge detection result. FIG. 9B illustrates a result of binarization in a case that the threshold value is 500. As a result of binarization, pixels having a value of 1 are detected as a text edge. Then, for each pixel having a value of 1 as a result of binarization, the foreground generation section 31 judges whether the pixel is a black pixel. Then, when the pixel is a black pixel, the value corresponding to the pixel is set to be 1. When the pixel is not a black pixel, the value corresponding to the pixel is set to be 0. As the processing of judging an black pixel, as described above, it is judged whether R=G=B<TH1 or alternatively it is judged whether when each of |R-G|, |G-B|, and |B-R| is smaller than TH2 and each of R, G, and B is smaller than TH1. FIG. 10 illustrates a result of judgment of black pixels in a case that TH1=60 and TH2=10. The pixels having a value of 1 in FIG. 10 are pixels finally detected as the edge of a black text.

After the completion of step S1, the foreground generation section 31 calculates the total of the densities of the pixels detected as the edge of a black text, then counts the number of pixels of the edge of a black text, and then divides the total of the densities by the number of pixels so as to calculate the average of black densities in the edge of a black text (S2). As the density of a pixel, for example, the average of the values of R, G, and B is adopted. The compression processing section 3 uses the calculated average of black densities, as black information indicating the black density of the black text. By virtue of this, the density of the black text edge is substituted by a density satisfactorily close to the black density of the not-yet compressed original document. Here, for simplicity of the processing, the black density may be a fixed value defined in advance, and then step S2 may be omitted.

Then, the foreground generation section 31 generates a binary image from the original document so as to generate a foreground layer, for example, by a method that the density of the pixels corresponding to the detected edge of a black text is set to be 1 and then the density of other pixels is set to be 0 (S3). After generating the foreground layer, the foreground generation section 31 outputs the foreground layer and the black information to the lossless compressing section 32, and then terminates the processing.

Figure 11:
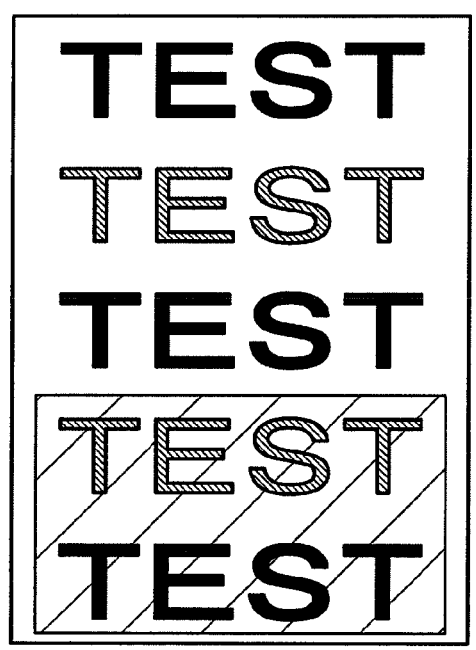
FIG. 11 is a schematic diagram illustrating an example of an original document.

FIG. 11 is a schematic diagram illustrating an example of an original document. Among the five lines of "TEST" contained in the original document illustrated in FIG. 11, the first, the third, and the fifth lines are composed of black texts. The second and the fourth lines are composed of chromatic texts. Further, the background of the texts in the first, the second, and the third lines is white. The background of the texts in the fourth and the fifth lines is chromatic. FIG. 12 is a schematic diagram illustrating an example of a foreground layer, and illustrates an example that the edges of black texts are extracted from the original document illustrated in FIG. 11 so that a binary image is generated. Each part painted black in the figure indicates a part whose pixels have a density of 1. Each white part in the figure indicates a part whose pixels have a density of 0. The density 0 indicates that the pixel is transparent. As illustrated in FIG. 12, among the texts contained in FIG. 11, the edges of black texts alone are detected, so that a binary image adopted as a foreground layer is generated.

Figure 13:
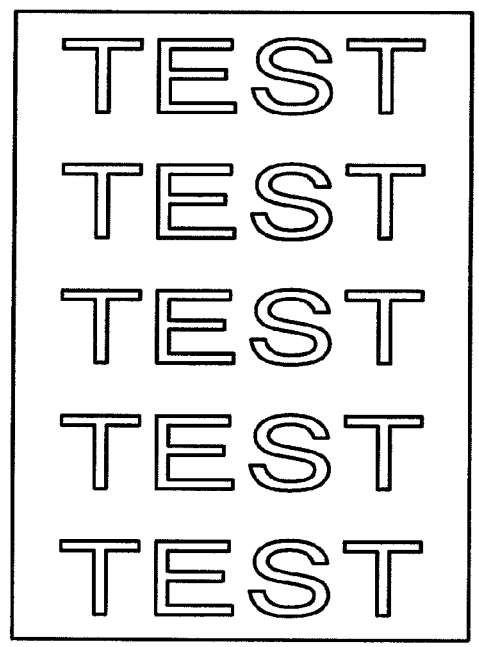
FIG. 13 is a schematic diagram illustrating a result obtained by performing edge detection alone onto an original document.

FIG. 13 is a schematic diagram illustrating a result obtained by performing edge detection alone onto the original document. This figure illustrates a result of detection of the edge of each text from the original document illustrated in FIG. 11. In a mode that the segmentation class signals are not inputted from the segmentation processing section 24, the foreground generation section 31 detects the edge of each text so as to obtain the result illustrated in FIG. 13. In this stage, as illustrated in FIG. 13, the edge of each black text and the edge of each chromatic text are detected. The foreground generation section 31 performs the processing of judging black pixels onto the result of edge detection illustrated in FIG. 13, so as to obtain the binary image illustrated in FIG. 12.

Next, processing performed by the density difference reducing section 34 is described below. The density difference reducing section 34 sequentially selects a pixel contained in the original document, and then judges whether the pixel of interest is a pixel contained in the edge of a black text. Specifically, the density difference reducing section 34 performs processing similar to that by the foreground generation section 31 described above, so as to judge whether the pixel of interest is a pixel contained in the edge of a black text. When the pixel of interest is a pixel contained in the edge of a black text, the density difference reducing section 34 performs filtering such that the weighted mean of densities is calculated for the pixels located in the surroundings of the eight near neighbor pixels of the pixel of interest. FIG. 14 is a conceptual diagram illustrating an example of a filter employing the weighted mean. When this filter is employed, the weighted mean of densities is obtained for the pixels located in the surroundings of the eight near neighbor pixels of the pixel of interest. This reduces the density difference between each pixel in the black text area and the pixels of its surroundings.

When the pixel of interest is a pixel not contained in the black text area, the density difference reducing section 34 performs smoothing by using a smoothing filter. The smoothing performed here is weak smoothing to an extent that moire does not occur in the halftone dot. FIG. 15 is a conceptual diagram illustrating an example of such a smoothing filter. When this smoothing filter is employed, smoothing is performed between the pixel of interest and the eight near neighbor pixels of the pixel of interest. Here, the filter coefficients illustrated in FIGS. 14 and 15 are merely examples, and employable values are not limited to these.

FIGS. 16A, 16B and 17 are conceptual diagrams each illustrating an example of a processing result obtained by the density difference reducing section 34. FIG. 16A illustrates an example of an original document. FIG. 16B illustrates a result of detection of the edge of a black text from the original document illustrated in FIG. 16A. FIG. 17 illustrates a result of filtering and smoothing performed on the original document illustrated in FIG. 16A by using the filters illustrated in FIGS. 14 and 15. Here, in this example, R=G=B=255 is assumed for the entire outer area not illustrated in the image. When such filtering is performed, the density difference is reduced in the surroundings of the edge of a black text so that ringing noise caused in association with lossy compression is suppressed. Further, the smoothing suppresses the occurrence of ringing noise and of moire in halftone dots in the areas other than those near the edge, and further contributes even to the improvement of the compression rate. The processing result illustrated in FIG. 17 corresponds to a background layer. The density difference reducing section 34 obtains such a processing result illustrated in FIG. 17 so as to generate a background layer, and then outputs the generated background layer.

Next, processing in the low-resolution image generating section 36 is described below. The low-resolution image generating section 36 performs interpolation such as simple downsampling, nearest neighbor, bilinear, and bicubic on the background layer generated by the density difference reducing section 34, so as to achieve resolution reduction on the background layer. FIG. 18 is a conceptual diagram illustrating an example of a result of resolution reduction. The image illustrated in FIG. 18 is a result obtained when the resolution of the background layer illustrated in FIG. 17 is reduced to ½ by a bilinear method. In this case, the center of 2×2 pixels is adopted as the bilinear starting point. Thus, the average (truncated at the decimal point) of the 2×2 pixels is obtained as the result of bilinear processing. As illustrated in FIG. 18, the number of pixels of the background layer is reduced by the resolution reduction, and hence the amount of data is reduced. The fine shape of the text contained in the original document is reproducible by the foreground layer. Thus, the resolution reduction on the background layer causes merely small influence on the reproducibility of the image. Accordingly, file size reduction is achieved without degradation in the reproducibility of the image.

Next, processing in the density correction sections 37 and 38 is described below. When filtering in the density difference reducing section 34, resolution reduction in the low-resolution image generating section 36, and lossy compression in the lossy compressing section 35 are performed, the density of the entire image of the background layer is corrected in the direction of equalization. Thus, the contrast in the background layer is reduced. Accordingly, before the filtering in the density difference reducing section 34 and before the lossy compression in the lossy compressing section 35, density correction is performed for enhancing of the densities of the pixels of the background layer. Each of the density correction sections 37 and 38 has a one-dimensional look-up table, and performs the processing of converting the density of each pixel in the background layer by using the look-up table.

Figure 19B:
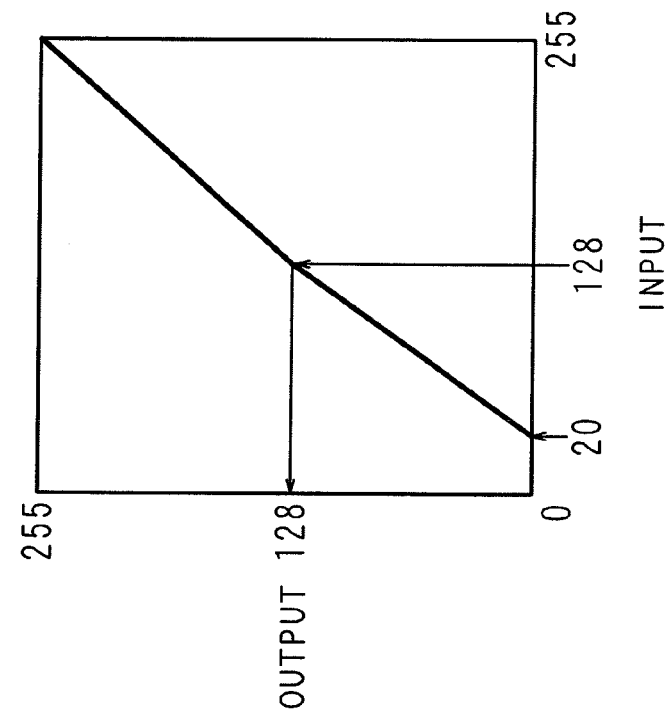
FIGS. 19A and 19B are characteristics diagrams illustrating an example of a look-up table.
Figure 19A:
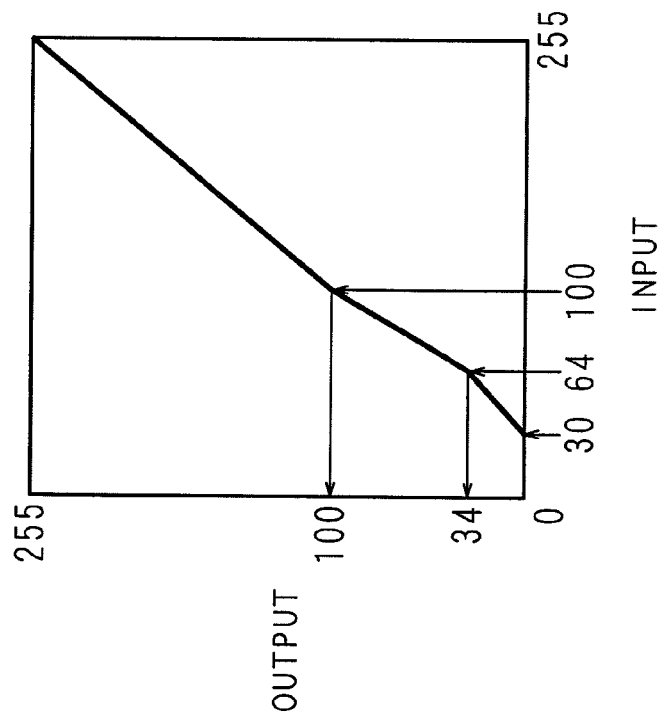

FIGS. 19A and 19B are characteristics diagrams illustrating an example of a look-up table. FIG. 19A illustrates a look-up table in the density correcting section 37. FIG. 19B illustrates a look-up table in the density correcting section 38. The horizontal axis in the figure indicates the input density, and the vertical axis indicates the output density. Then, the density of each pixel of the background layer is converted into an output density corresponding to the input density as illustrated in FIGS. 19A and 19B. As illustrated in FIGS. 19A and 19B, the look-up table is set up such that the input density is converted into a value greater than or equal to the present density. A smaller density corresponds to dense color of the pixel. Thus, the density of the pixels of the background layer is enhanced. In the example illustrated in FIG. 19A, an input density between 0 and 30 is converted into a density 0, and an input density between 30 and 64 is converted into a density obtained by subtracting 30 from the input value. Further, when the input density falls between 65 and 100, the conversion relation between the input and the output is proportionally changed such that the input density 100 corresponds to the output density 100. Further, when the input density falls between 100 and 255, conversion is such that input=output. In the example illustrated in FIG. 19B, an input density between 0 and 20 is converted into a density 0. When the input density falls between 20 and 128, the conversion relation between the input and the output is proportionally changed such that the input density 128 corresponds to the output density 128. Further, when the input density falls between 128 and 255, conversion is such that input=output. The density correction in the density correcting section 38 is performed again on the background layer having undergone the density correction in the density correcting section 37, before lossy compression is performed. As illustrated in FIGS. 19A and 19B, the extent of density enhancement may be lower than the density correction in the density correcting section 37. Here, the look-up tables illustrated in FIGS. 19A and 19B are merely examples, and employable tables are not limited to these. The look-up tables used in the density correction sections 37 and 38 may be different from each other as illustrated in FIGS. 19A and 19B, or alternatively may be the same with each other. When the look-up tables are the same with each other, the memory capacity necessary in the compression processing section 3 is reduced. When the look-up tables are different from each other, more detailed density control is achieved it in accordance with the density decrease in each processing in the compression processing section 3.

FIGS. 20A, 20B, 21A and 21B are conceptual diagrams each illustrating an example of processing results of density correction performed by the density correction sections 37 and 38. These figures illustrate processing results obtained in the compression processing section 3 illustrated in FIG. 5. FIG. 20A illustrates a processing result obtained by density correction performed on the original document illustrated in FIG. 16A by the density correcting section 37. In this figure, the density of each pixel is converted into a denser color (a smaller value) than in FIG. 16A. FIG. 20B illustrates a background layer generated by the density difference reducing section 34 on the basis of the processing result illustrated in FIG. 20A. In this figure, the density of the background layer is enhanced in comparison with the background layer illustrated in FIG. 17. FIG. 21A illustrates a result of resolution reduction performed by the low-resolution image generating section 36 onto the background layer illustrated in FIG. 20B. Further, FIG. 21B illustrates a processing result obtained by density correction performed by the density correcting section 38 onto the background layer illustrated in FIG. 21A. In comparison with the background layer illustrated in FIG. 18, the background layer having undergone density correction illustrated in FIG. 21B has smaller densities of the pixels, that is, the density is enhanced. Thus, after that, even when lossy compression is performed by the lossy compressing section 35, the contrast remains high.

As a result of the processing performed by the individual sections of the above-mentioned compression process sections 3, a foreground layer and a background layer are generated from the original document. Then, the foreground layer, the black information, and the background layer are inputted to the compressed file generating section 33. The compressed file generating section 33 combines into a single file the foreground layer having undergone lossless compression, the background layer having undergone lossy compression, and decompression information containing the information that the black density of the black texts indicated by the black information is set to be the color of the black pixels contained in the foreground layer. As a result, a compressed file is obtained. By virtue of this, the color of black texts in the image obtained by decompressing the compressed file is set to be black near the black in the background layer. This suppresses the density difference in the black between the background layer and the contour of the black text.

Figure 22C:
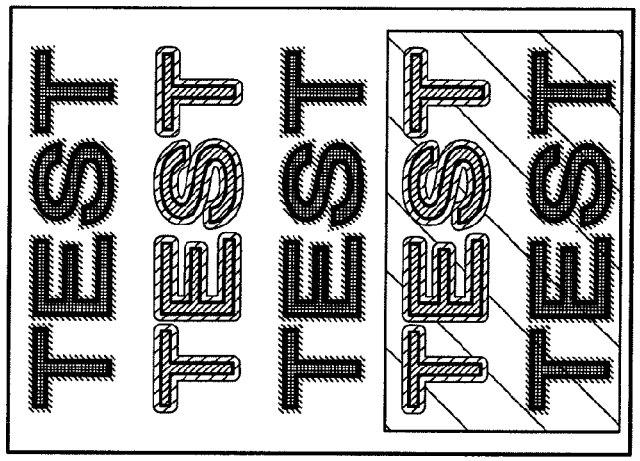
FIGS. 22A, 22B and 22C are schematic diagrams illustrating an example of a processing result obtained by a compression process section.
Figure 22B:
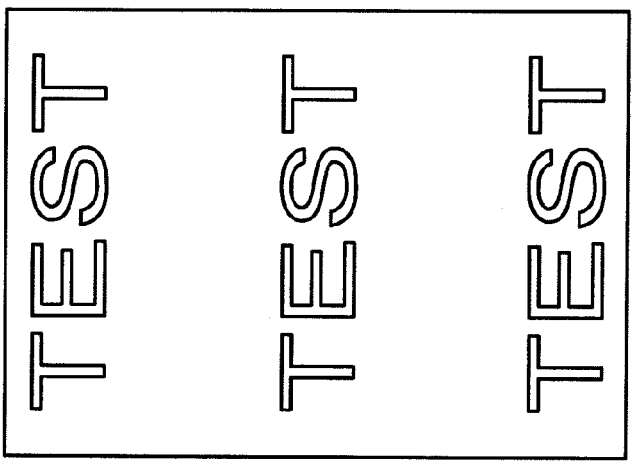
Figure 22A:
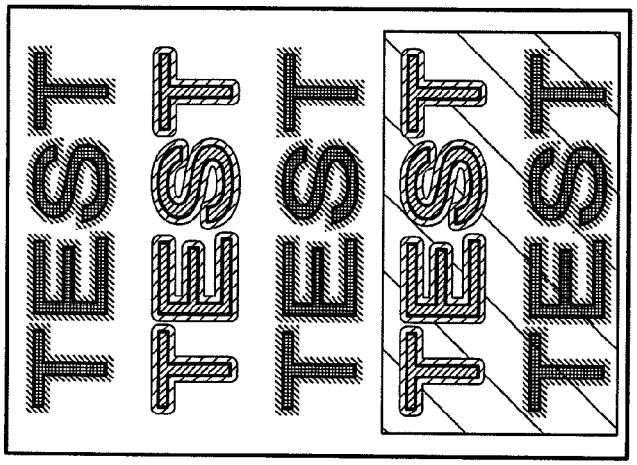

FIGS. 22A, 22B and 22C are conceptual diagrams illustrating an example of a processing result in the compression processing section 3. This figure illustrates a result of image processing performed on the original document illustrated in FIG. 11. FIG. 22A illustrates a background layer, and FIG. 22B illustrates a foreground layer. The background layer is almost the same as the original document. The foreground layer is a binary image expressing the edge of each black text. FIG. 22C illustrates an image obtained by decompressing the compressed file, and is an image obtained by layer composition of the foreground layer and the background layer. FIGS. 22 A, 22B and 22C are illustrated in a state that the edge of each black text is emphasized. However, the actual edge is drawn with black having a density near the color of the black text in the background layer. The contour of each black text is expressed by the foreground layer having undergone lossless compression, and hence is represented clearly. Thus, high visual recognition is obtained in the black texts. Further, the density difference of the black texts from the other parts is smaller. Thus, noise caused in association with lossy compression of the background layer is suppressed, and so is degradation in the visual recognition of black texts. In the texts formed in chromatic color, the processing of reducing the density difference and the processing of lossy compression have caused blotting and a slight blur. However, when the density correction in the density correction sections 37 and 38 is performed with more appropriate conditions, their visual recognition is improved.

Figure 23A:
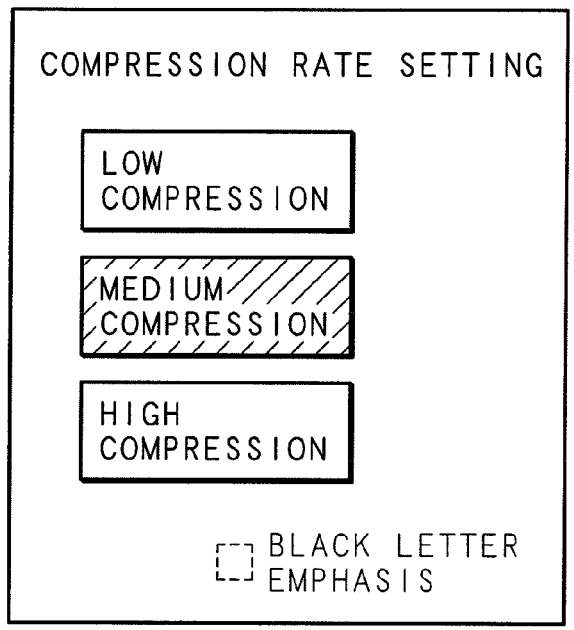
FIGS. 23A and 23B are schematic diagrams illustrating an example of display of an operation panel used for setting up a method of generating a compressed file.
Figure 23B:
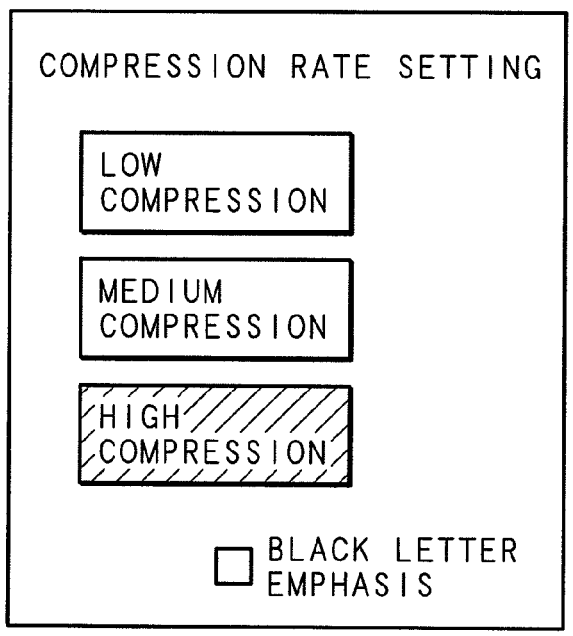

In the image forming apparatus 1, selection may be allowed between the processing of generating a compressed file in which the visual recognition of black texts is improved by employing the present invention and the processing of generating a compressed file by an ordinary method. In the mode that the selection is allowed, the image forming apparatus 1 receives instruction from a user through the control panel 12, and then sets up a method of generating a compressed file. FIGS. 23A and 23B are schematic diagrams illustrating an example of display of the control panel 12 used for setting up a method of generating a compressed file. The control panel 12 displays a setting screen illustrated in FIGS. 23A and 23B onto the display section, and then receives instruction from the user through the reception section. A compression rate to be employed at the time of generating a compressed file is selected from three options: low compression, medium compression, and high compression. FIG. 23A illustrates an example that medium compression is selected. FIG. 23B illustrates an example that high compression is selected. When high compression is selected, further, a check box "black letter emphasis" may be filled. When "black letter emphasis" is specified further in the setting screen, the processing of generating a compressed file in which the visual recognition of black texts is improved by employing the present invention is set up. When the file size of a compressed file is desired to be reduced and the visual recognition of black texts is desired to be improved, these desires are satisfied when the compressed file is generated by employing the present invention. When a high compression rate is not necessary, or alternatively when the visual recognition of texts of chromatic color is desired to be improved to some extent in addition to black texts, a compressed file may be generated by employing an ordinary method.

Further, in the image forming apparatus 1, an image based on the compressed file generated by the compression processing section 3 may be formed by the color image output apparatus 13. In the image forming apparatus 1 in this case, decompression is performed by a decompression processing section (not illustrated) onto the compressed file generated by the compression processing section 3 or alternatively the compressed file stored in the storing section 30, so that the foreground layer and the background layer are decompressed and then layer composition is performed on the foreground layer and the background layer. The color image processing apparatus 2 performs necessary image processing on the image data obtained by layer composition of the foreground layer and the background layer, and then outputs the result to the color image output apparatus 13. The color image output apparatus 13 forms a color image on the basis of the image data.

As described above in detail, in the present invention, when an original document containing black texts is to be compressed, the edge of each black text of the original document is detected. Then, a foreground layer is generated in which the detected edges are expressed in the form of a binary image. Then, lossless compression is performed on the foreground layer. Further, a background layer is generated in which the density difference of the edge of each black text from the other parts in the original document is reduced. Then, lossy compression is performed on the background layer. Since the edge of each black text is detected in place of the entire text so that foreground layer is generated, a situation is avoided that black texts are incorporated into the background layer and that the texts are blurred in association with lossy compression. This permits easy separation of the texts from the background. Since the contour of each black text is expressed by the foreground layer having undergone lossless compression, each text is expressed clearly. This enhances visual recognition of black texts in the image obtained by decompressing the compressed file. As such, since visual recognition is improved in black texts used most frequently in various kinds of documents, even in an image obtained by compressing a document, high visual recognition of texts is achieved and the document is reused easily.

Fur, in the present invention, for the purpose of reducing the density difference in the image, filtering by employing the weighted mean of densities of the surrounding pixels is performed on each pixel contained in the edge of a black text. This causes blur in the edge of each black text in the periphery of the black text, and hence the density difference of the black text from the background is reduced. Further, for the pixels other than the edge of each black text, smoothing of the density is performed so that density fluctuation is reduced in areas other than the periphery of each black text. Since the density difference of each black text from the background is reduced in the periphery of the black text, ringing noise generated in association with lossy compression of the background layer is suppressed. Further, since the density fluctuation is reduced in areas other than the periphery of each black text, at the time of lossy compression of the background layer, the occurrence of ringing noise and moire is suppressed in areas other than the periphery of each black text. As such, since the occurrence of noise caused in association with compression of the image is suppressed, degradation is suppressed in the black texts in the image obtained by decompressing the compressed file.

Embodiment 2

Figure 24:
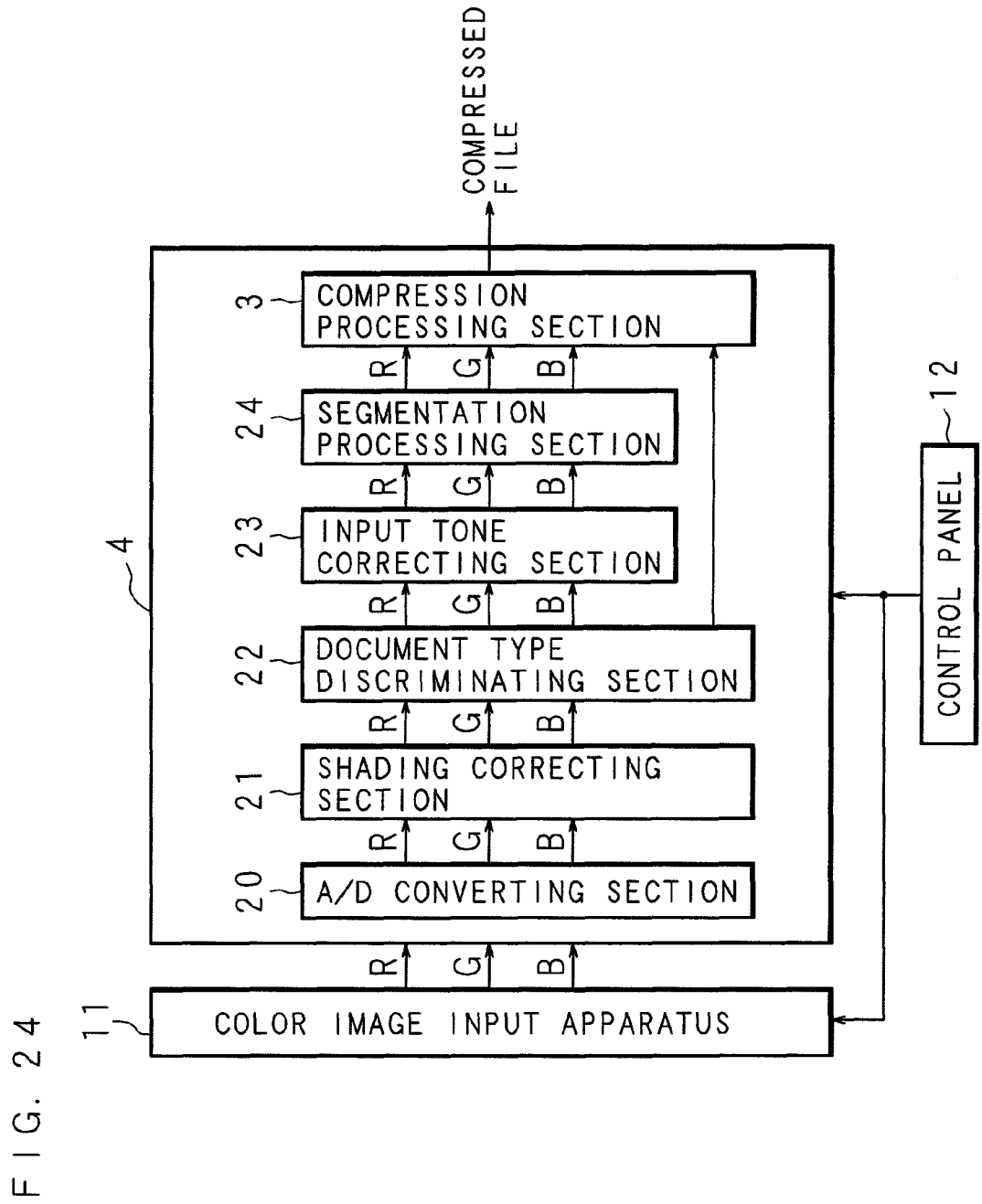
FIG. 24 is a block diagram showing functional components included in the scanner apparatus containing the image forming apparatus according to the embodiment 2.

The image compressing apparatus according to the present invention is described in embodiment 2 to be a part of scanner apparatus, although described in embodiment 1 to be a part of the image forming apparatus. The scanner apparatus corresponds to the compressed image outputting apparatus of the present invention. FIG. 24 is a block diagram showing functional components included in the scanner apparatus containing the image forming apparatus according to the embodiment 2. The scanner apparatus includes the color image input apparatus 11 that optically reads out a color image from a document, and is connected to an image processing apparatus 4. The image processing apparatus 4 is connected to a host apparatus (not shown), such as a personal computer (PC), through communication cable or communication network. The control panel 12 is connected to the color image input apparatus 11 and the image processing apparatus 4.

The color image input apparatus 11 performs image processing, similarly in embodiment 1, and outputs the RGB analog signal obtained from the read color image toward the image processing apparatus 4. The image processing apparatus 4 converts the analog signal input by the color image input apparatus 11 into the digital signal with utilizing the A/D converting section 20. Then, the image processing apparatus 4 transmits the converted digital signal to the shading correcting section 21, the document type discriminating section 22, the input tone correcting section 23, the segmentation processing section 24 and then the compression processing section 3. The compression processing section 3 corresponds to the image compressing apparatus according to the present invention. The embodiment 2 configures the A/D converting section 20, the shading correcting section 21, the document type discriminating section 22 and the input tone correcting section 23, similarly to the embodiment 1. The segmentation processing section 24 outputs the RGB signal input by the input tone correcting section 23 toward the compression processing section 3.

The compression processing section 3 in embodiment 2 is configured, similarly to the compression processing section 3 in embodiment 1, accepts the image data of RGB signal input from the segmentation processing section 24, performs the image compressing method according to the present invention, similarly to the compression processing section 3 in embodiment 1, and thus generates the compression file obtained through compressing the input image data. The compression processing section 3 then outputs the generated compression file to the host apparatus (not shown). The host apparatus receives the compression file being output by the image processing apparatus 4, and performs further processing, such as the storage of the compression file, the external transmission of the compression file or the image output based on the compression file. The embodiment 2 may alternatively utilize a digital camera, instead of the color image input apparatus 11.

As described above, also in the present embodiment, similarly to Embodiment 1, at the time of compression of an original document containing black texts, the edges of black texts are detected and then generates the foreground layer, and then generates the background layer by reducing the density difference between the edges of black texts and the other parts in the original document. Therefore, it is possible to improve the visual recognition of the text on the reproduced image. Hence, the scanner apparatus in the embodiment 2 implements not only improving the visual recognition of the text on the reproduced image, but also reducing data size of the compression file.

Embodiment 3

The image compressing apparatus according to the present invention is described in embodiment 3 to be a general-purpose computer. FIG. 25 is a block diagram showing an example of inner components included in the image compressing apparatus 5 according to embodiment 3. The image compressing apparatus 5 in the embodiment 3 is configured with the general-purpose computer, such as a PC or a server apparatus. The image compressing apparatus 5 includes: a CPU 51 that performs calculations; a RAM 52 that stores temporal information generated by the calculations; a driver section 53, such as a CD-ROM drive, that reads out information from a computer readable medium 6 according to the present invention, such as a optical disk; and a storing section 54, such as a hard disk. The CPU 51 makes the driver section 53 read out computer program 61 according to the present invention and makes the storing section 54 store the read computer program 61. The computer program 61 is loaded on the RAM 52 from the storing section 54, according to need, and then the CPU 51 performs required processing for the image compressing apparatus 5 based on the loaded computer program 61.

The image compressing apparatus 5 includes: an inputting section 55, such as a keyboard or a pointing device, that inputs information, such as an operation instruction, in response to user's manipulation; and a displaying section 56, such as a liquid crystal display, that displays several information. The image compressing apparatus 5 further includes: a transmitting section 57 that can be connected to external communication network (not shown); and a receiving section 58 connected to an external inputting apparatus 62 for inputting image data. The transmitting section 57 is, for example, a network card, a modem or the like. The inputting apparatus 62 is, for example, a flatbed scanner, a film scanner, a digital camera or the like. The inputting apparatus 62 optically reads out an image, generates image data, and transmits the generated image data to the image compressing apparatus 5. The receiving section 58 receives the transmitted image data from the inputting apparatus 62. The transmitting section 57 can externally transmit data through the communication network with utilizing communication method such as a facsimile or an e-mail.

The CPU 51 loads the computer program 61 according to the present invention onto the RAM 52, and performs the image compressing method according to the present invention based on the loaded computer program 61. Thus, when the receiving section 58 receives image data input from the inputting apparatus 62, the CPU 51 performs processing for generating the foreground layer, compressing with the lossless compression, reducing the density difference between the edges of black texts and the other parts in the original document, compressing with the lossy compression and generating the compression file, similar to the processing in the embodiment 1 performed by the foreground generating section 31, the lossless compressing section 32, density difference reducing section 34, the lossy compressing section 35 and the compressed file generating section 33. Hence, the CPU 51 generates the compression file based on the received image data on which the compression processing is performed. The CPU 51 stores the generated compression file on the storing section 54. In accordance with the loaded computer program 61, the CPU 51 makes the transmitting section 57 externally transmit the generated compression file or the read compression file from the storing section 54.

As described above, also in the present embodiment, similarly to Embodiment 1 and 2, at the time of compression of an original document containing black texts, the edges of black texts are detected and then generates the foreground layer, and then generates the background layer by reducing the density difference between the edges of black texts and the other parts in the original document. Therefore, it is possible to improve the visual recognition of the text on the reproduced image. Hence, the image compressing apparatus in the embodiment 3 implements not only improving the visual recognition of the text on the reproduced image, but also reducing data size of the compression file.

As storing the computer program 61 according to the present invention, the computer readable medium 6 according to the present invention may be configured with a magnetic tape, a magnetic disk, a removable hard disk, an optical disk (e.g., CD-ROM, MO, MD, DVD or the like) or a card-type computer readable medium (e.g., IC card, memory card, optical card or the like). Alternatively, the computer readable medium 6 according to the present invention may be a semi-conductor memory (e.g., a mask ROM, an Erasable Programmable Read Only Memory [EPROM], Electrically Erasable Programmable Read Only Memory [EEPROM], a flash ROM or the like), which can be mounted on the image compressing apparatus 5 and whose stored contents can be read out by the CPU 51.

Alternatively, the computer program 61 according to the present invention may be downloaded from an external server apparatus (not shown) to the image compressing apparatus 5 through the communication network, such as the Internet or LAN, and may be stored on the storing section 54. In this alternative embodiment, required program for downloading the computer program 61 may be previously stored on the storing section 54 or may be read out from a predetermined computer readable medium by the driver section 53, stored on the storing section 54 and loaded on the RAM 52 according to need.

Embodiments 1 to 3 given above have been described for a mode that pixels corresponding to the edges of black texts are extracted as the pixels to be contained in the foreground layer. However, employable embodiments are not limited to these. That is, in the present invention, pixels corresponding to a line drawing whose pixel color is black may be extracted as the pixels to be contained in the foreground layer. Further, in the present invention, pixels corresponding to black texts or black line drawings may be extracted as the pixels to be contained in the foreground layer.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image compressing apparatus for compressing an original document composed of a plurality of pixels, comprising:
   a first image generating section detecting from the original document an edge of a text and/or a line drawing whose pixel color is black and then generating a first image in which the detected edge is expressed in the form of a binary image;
   a lossless compressing section performing lossless compression on the generated first image;
   a second image generating section generating a second image in which the color of the pixels contained in the original document is adjusted such that a density difference of color should be reduced between pixels contained in the edge detected by the first image generating section and the other pixels among the pixels contained in the original document;
   a lossy compressing section performing lossy compression on the generated second image; and
   a compressed file generating section generating a compressed file containing the first image having undergone lossless compression and the second image having undergone lossy compression.

2. The image compressing apparatus according to claim 1, wherein
   the second image generating section replaces a density indicating the density of color of a pixel contained in the edge detected by the first image generating section with an average of densities of pixels in the surroundings of the eight near neighbor pixels of said pixel.

3. The image compressing apparatus according to claim 1, wherein
   the second image generating section smoothes the densities of the pixels which are not contained in the edge detected by the first image generating section.

4. The image compressing apparatus according to claim 1, further comprising a resolution reducing section performing resolution reduction on the image having not yet undergone lossy compression.

5. The image compressing apparatus according to claim 1, further comprising:
   a first density correcting section performing processing of correcting the density of each pixel onto the original document having not yet undergone the adjustment of the color of pixels by the second image generating section, such that the density of color of each pixel is increased; and
   a second density correcting section performing processing of correcting the density of each pixel onto the second image having not yet undergone lossy compression, such that the density of color of each pixel is increased.

6. The image compressing apparatus according to claim 1, wherein
   the first image generating section calculates an average of densities indicating the densities of color of the pixels contained in the detected edge,
   further comprising
   a color determining section setting the color of the first image having undergone lossless compression to be the calculated average.

7. A compressed image outputting apparatus comprising:
   an image compressing apparatus according to claim 1,
   an image receiving section receiving an original document to be compressed by the image compressing apparatus; and
   an outputting section outputting to the outside a compressed file generated by the image compressing apparatus.

8. An image compression method for compressing an original document composed of a plurality of pixels, comprising:
   a step of detecting from the original document an edge of a text and/or a line drawing whose pixel color is black;
   a step of generating a first image in which the detected edge is expressed in the form of a binary image;
   a step of performing lossless compression on the generated first image;
   a step of generating a second image in which the color of the pixels contained in the original document is adjusted such that a density difference of color is reduced between pixels contained in the detected edge and the other pixels among the pixels contained in the original document;
   a step of performing lossy compression on the generated second image; and
   a step of generating a compressed file containing the first image having undergone lossless compression and the second image having undergone lossy compression.

9. A non-transitory computer-readable recording medium carrying a computer program for causing a computer to execute processing of compressing an original document composed of a plurality of pixels,
   said computer program comprising:
   a step of detecting from the original document an edge of a text and/or a line drawing whose pixel color is black;
   a step of generating a first image in which the detected edge is expressed in the form of a binary image;
   a step of performing lossless compression on the generated first image;
   a step of generating a second image in which the color of the pixels contained in the original document is adjusted such that a density difference of color is reduced between pixels contained in the detected edge and the other pixels among the pixels contained in the original document;

a step of performing lossy compression on the generated second image; and a step of generating a compressed file containing the first image having undergone lossless compression and the second image having undergone lossy compression.

\* \* \* \* \*